(12) United States Patent
Chimento et al.

(10) Patent No.: US 7,975,776 B2
(45) Date of Patent: Jul. 12, 2011

(54) ADJUSTABLE TOWING HITCH

(76) Inventors: Larry Chimento, Marshallville, OH (US); Robert K. Petit, Doylestown, OH (US); Craig Forrer, Apple Creek, OH (US)

(*) Notice: Subject to any disclaimer, the term of this patent is extended or adjusted under 35 U.S.C. 154(b) by 0 days.

(21) Appl. No.: 12/464,830

(22) Filed: May 12, 2009

(65) Prior Publication Data
US 2010/0038882 A1    Feb. 18, 2010

Related U.S. Application Data

(63) Continuation-in-part of application No. 11/788,885, filed on Apr. 23, 2007, now abandoned.

(60) Provisional application No. 61/052,409, filed on May 12, 2008.

(51) Int. Cl.
*A01B 51/00* (2006.01)

(52) U.S. Cl. .............. 172/272; 172/677; 280/416.1

(58) Field of Classification Search .......... 172/439, 172/445, 448, 677, 680, 776, 245, 246–248, 172/272; 280/416.1, 416.2, 417.1, 460.1, 280/467, 462, 493, 494, 498, 499
See application file for complete search history.

(56) References Cited

U.S. PATENT DOCUMENTS

| | | | |
|---|---|---|---|
| 2,658,770 A | 11/1953 | Koenig | |
| 2,854,251 A | 9/1958 | Able | |
| 2,910,307 A | 10/1959 | Jennings | |
| 4,245,458 A | 1/1981 | Smith | |
| 5,149,122 A * | 9/1992 | Helber | 280/491.2 |
| 5,226,657 A * | 7/1993 | Dolphin | 280/478.1 |
| 5,327,978 A * | 7/1994 | Bremner | 172/439 |
| 5,361,850 A * | 11/1994 | Muller et al. | 172/450 |
| 5,544,708 A * | 8/1996 | Braun | 172/272 |
| 5,915,715 A | 6/1999 | Ford | |
| 6,042,135 A | 3/2000 | Ross | |
| 6,148,928 A | 11/2000 | Spears | |
| 6,149,180 A * | 11/2000 | Haws | 280/479.1 |
| 6,168,182 B1 | 1/2001 | Ford | |
| 6,220,618 B1 | 4/2001 | Smith et al. | |
| 6,257,347 B1 * | 7/2001 | Campisi | 172/439 |
| 6,796,384 B1 | 9/2004 | Potter | |
| 7,100,704 B2 * | 9/2006 | Potter | 172/439 |

(Continued)

OTHER PUBLICATIONS

Hitch Hand. Lund International. 2005. http://web.archive.org/web/20060103090130/www.lundinternational.com/lund_int_truck_product_detail_objectname_Hitch._Hand_truck.aspx.

(Continued)

*Primary Examiner* — Robert E Pezzuto
*Assistant Examiner* — Matthew D Troutman
(74) *Attorney, Agent, or Firm* — Pearne & Gordon LLP

(57) ABSTRACT

Provided is a hitch for towing a trailer behind a vehicle licensed to navigate public roadways. The hitch includes a base member to be coupled adjacent to a tail section of the vehicle, and a first support member portion coupled transversely to the elongated shank and extending outwardly in a direction generally away from the base member. A first arm is telescopically adjustable relative to the support member and supports a first connector provided adjacent to a distal end thereof. The first gimbal connector is cooperable with a first trailer connector to establish a linkage with first trailer connector. A second support member portion is coupled to the base member and extends outwardly in a direction generally away from the base member. A second connector is supported adjacent to a distal end of the second support member and is also cooperable with a second trailer connector to establish a linkage with the second trailer connector.

16 Claims, 20 Drawing Sheets

U.S. PATENT DOCUMENTS

| | | | |
|---|---|---|---|
| 7,188,848 B2 * | 3/2007 | Chapman | 280/78 |
| 7,658,569 B2 * | 2/2010 | de Oliveira | 403/330 |
| 2004/0012170 A1 * | 1/2004 | McCoy | 280/495 |
| 2005/0028992 A1 * | 2/2005 | Potter | 172/439 |
| 2005/0028993 A1 * | 2/2005 | Potter | 172/439 |
| 2006/0017259 A1 | 1/2006 | Chapman | |
| 2007/0102168 A1 * | 5/2007 | Oliveira | 172/272 |
| 2008/0006416 A1 * | 1/2008 | Hubscher et al. | 172/460 |
| 2008/0036178 A1 | 2/2008 | Slaubaugh | |

OTHER PUBLICATIONS

Model HK-501. Worksaver. Product Catalog, 1989.

\* cited by examiner

ADJUSTABLE TOWING HITCH

This Application is a continuation-in-part of U.S. patent application Ser. No. 11/788,885, filed on Apr. 23, 2007, and also claims the benefit of Provisional Application Ser. No. 61/052,409, filed on May 12, 2008, both of which are incorporated in their entirety herein by reference.

BACKGROUND OF THE INVENTION

1. Field of the Invention

The present invention is directed generally to a towing hitch, and more particularly to a towing hitch for coupling a farm implement to a truck licensed for public transportation on public roadways.

2. Description of Related Art

Agricultural implements such as plows, hay balers, spreaders, mowers and other such trailers are towed behind an agricultural tractor 8 while in use. The connection between the trailer and the agricultural tractor 8 is facilitated with what is commonly referred to as a three-point hitch 2, which is shown in FIG. 1. As shown, the three-point hitch 2 includes a pair of lift arms 4 that are each independently pivotally coupled to a tail section 6 of the agricultural tractor 8 at a proximate end 7 of the lift arms 4. A connecting arm 11 is used to secure each of the lift arms 4 to an adjustable boom 14x having an elevation that can be adjusted by the agricultural tractor's hydraulic system. A bracket 16a formed at the tail section 6 of the agricultural tractor 8 includes a pin 17 that extends between a pair of braces 18a to receive an upper link arm (FIG. 2b) that is also coupled to the trailer being towed by the agricultural tractor 8.

Agricultural trailers that are to be towed behind agricultural tractors 8 typically include a connector 99 such as that shown in FIG. 2a, for example, comprising at least a pair of laterally extending pins 3. The pins 3 extend outwardly from the connector 99 to cooperate with an aperture 35 formed in each lift arm 4 of the three-point hitch 2 provided to the agricultural tractor 8. Each pin 3 is separated from the other by a fixed distance X, a distance X that can vary from trailer to trailer. To allow agricultural tractor 8 to tow a variety of different trailers having different distances X between the lateral pins 3 of the trailer, and to facilitate coupling of the trailer to the tractor 8, the lift arms 4 of the agricultural tractor 8 are pivotally connected to the agricultural tractor 8 so the lift arms 4 can travel in a plane generally parallel to the ground on which the agricultural tractor 8 rests, as indicated by the arrow 9 in FIG. 1. Thus, to hitch a trailer with the connector 99 in FIG. 2 to the agricultural tractor 8, the lift arms 4 are spread sufficiently apart and the trailer and/or tractor 8 properly positioned relative to the other. The lift arms 4 are then swung back towards each other to engage the pins 3 of the trailer and couple the trailer to the tractor 8. A locking pin serves to prevent the lift arms 4 from sliding off of the trailer pins 3 and causing the trailer to become disconnected from the agricultural tractor 8 when such disconnection is not desired. A chain 11 between the lift arms 4 and the agricultural tractor 8 limits the lateral travel of each lift arm 4 parallel to the ground along arrow 9 to prevent contact between the lift arms 4 and the tires of the agricultural tractor 8, while still allowing the trailer to pivot with respect to the agricultural tractor 8 such as when the agricultural tractor 8 turns.

While FIG. 2a illustrates what is often referred to as a two-point trailer connector, referring to the two pins 3 that establish the connection with a tractor 8, FIG. 2b illustrates a three-point connector 305. As the name implies, the two pins 3 are complemented by an upper link arm 302 that establishes a third connection point with the tractor 8 via communication with the pin 17. A receiver 320 defines an aperture 315 through which the pin 17 shown in FIG. 1 extends while the aperture 315 of the receiver 320 is coaxially aligned with similar apertures formed in the pair of braces 18a.

Farmers are often required to transport an agricultural trailer such as those mentioned above to a remote field located far away from the location where said trailer is stored. Further, agricultural trailers are subjected to harsh environments, and require regular maintenance to function properly, particularly at the beginning and end of each crop cycle when the trailer is removed from and returned to storage. Towing the agricultural trailer behind an agricultural tractor 8 to a remote field or a distant maintenance facility can be very time consuming due to the slow top speed of agricultural tractors 8, which are not designed or licensed for passenger transportation. While some maintenance facilities offer to transport the agricultural trailer and take it to the remote field or into the distant maintenance facility, such a service is expensive due again to the time required for such transportation with an agricultural tractor 8.

Accordingly, there is a need in the art for a trailer hitch to couple an agricultural trailer to a vehicle other than an agricultural tractor for transporting the agricultural trailer over public roadways. The vehicle can be licensed for public transportation on public roadways. Further, the trailer hitch can optionally accommodate trailers having a pair of laterally extending pins separated by a range of distances, optionally allow for vertical relative positioning of a portion of the trailer hitch and the trailer, and optionally be interchangeable with conventional hitches for towing traditional trailers over public roadways.

SUMMARY

According to one aspect, the present application involves a hitch for towing an agricultural implement behind a vehicle licensed to navigate public roadways. The hitch according to this aspect includes a base member including an elongated shank having a substantially rectangular cross section. The shank is to be at least partially inserted into a substantially rectangular interior passage defined by a receiver coupled to the vehicle for coupling the hitch to the vehicle. The hitch according to this aspect also includes a connector assembly including a transverse member supporting a first connector adjacent a first lateral end of the transverse member and a second connector adjacent a second, opposite lateral end of the transverse member. The first and second connectors are each adapted to cooperate with different portions of a three-point fastener configuration provided to the agricultural implement. A hinge assembly is provided for pivotally coupling the connector assembly to the base member. An actuator is pivotally coupled to the hitch to extend between the base member and the connector assembly to pivot the transverse member about the hinge assembly for selectively elevating and lowering the first and second connectors relative to the base member between an upper travel limit and a lower travel limit. The upper travel limit is vertically above the base member and the lower travel limit is vertically below the base member when the hitch is coupled to the vehicle.

According to another aspect, the present application involves a hitch for towing an agricultural implement behind a vehicle licensed to navigate public roadways. The hitch of this aspect includes a shank to be at least partially inserted into an interior passage defined by a receiver secured to a load withstanding structural feature of the vehicle. The shank includes a first shank portion that is to be substantially planar with the receiver when the hitch is secured to the vehicle, a third shank portion at a vertical elevation that is lower than an elevation of the first shank portion when the hitch is secured to the vehicle, and a second shank portion extending between the first and third shank portions. A connector assembly is provided and includes a support member for supporting a laterally adjustable segment. An extendable connector assembly can be coupled adjacent each opposite lateral end of the support member, and includes an extendable arm that can be adjusted in a direction generally away from the vehicle to which the hitch is coupled. A connector is provided adjacent to a distal end of each extendable arm, the connector being cooperable with a trailer connector to couple the agricultural implement to the hitch, wherein the laterally adjustable segment is adjustable to adjust a lateral distance separating the first connector from the second connector. A hinge pivotally couples the substantially transverse support member to the shank, and a hydraulic actuator extends between the connector assembly and the shank to pivot the connectors about the hinge and substantially-vertically adjust an elevation of the first and second connectors relative to the shank between an upper travel limit and a lower travel limit. The lower travel limit is at an elevation vertically below the first shank portion when the hitch is coupled to the vehicle.

According to one aspect, the present application involves a hitch for towing a trailer behind a vehicle licensed to navigate public roadways. The hitch includes a base member to be coupled adjacent to a tail section of the vehicle, wherein the base member comprises an elongated shank having a generally rectangular cross section to be received within a receiver coupled adjacent to a rearward portion of the vehicle. A first stationary support member portion is coupled transversely to the elongated shank and extends outwardly in a direction generally away from the base member. A first arm coupled to the first support member portion is telescopically adjustable relative to the stationary support member portion and transverse to the elongated shank. A first gimbal connector provided adjacent to a distal end of the first arm, the first gimbal connector being cooperable with a first trailer connector to establish a linkage between the first gimbal connector and the first trailer connector. Similarly, a second support member portion is coupled to the base member and extends outwardly in a direction generally away from the base member. A second gimbal connector is supported adjacent to a distal end of the second support member and is cooperable with a second trailer connector to establish a linkage between the second gimbal connector and the second trailer connector. And a brace extends between the elongated shank and at least one of the first and second support member portions to provide added support to the at least one of the first and second arms to maximize a towing capacity of the hitch. The towing capacity of the hitch is suitable for towing at least a class I trailer having a rated gross trailer weight of 2,000 lbs, but can also be adapted to tow a trailer having a rated gross trailer weight of 3,000 lbs, 4,000 lbs, 5,000 lbs, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Figure 1:
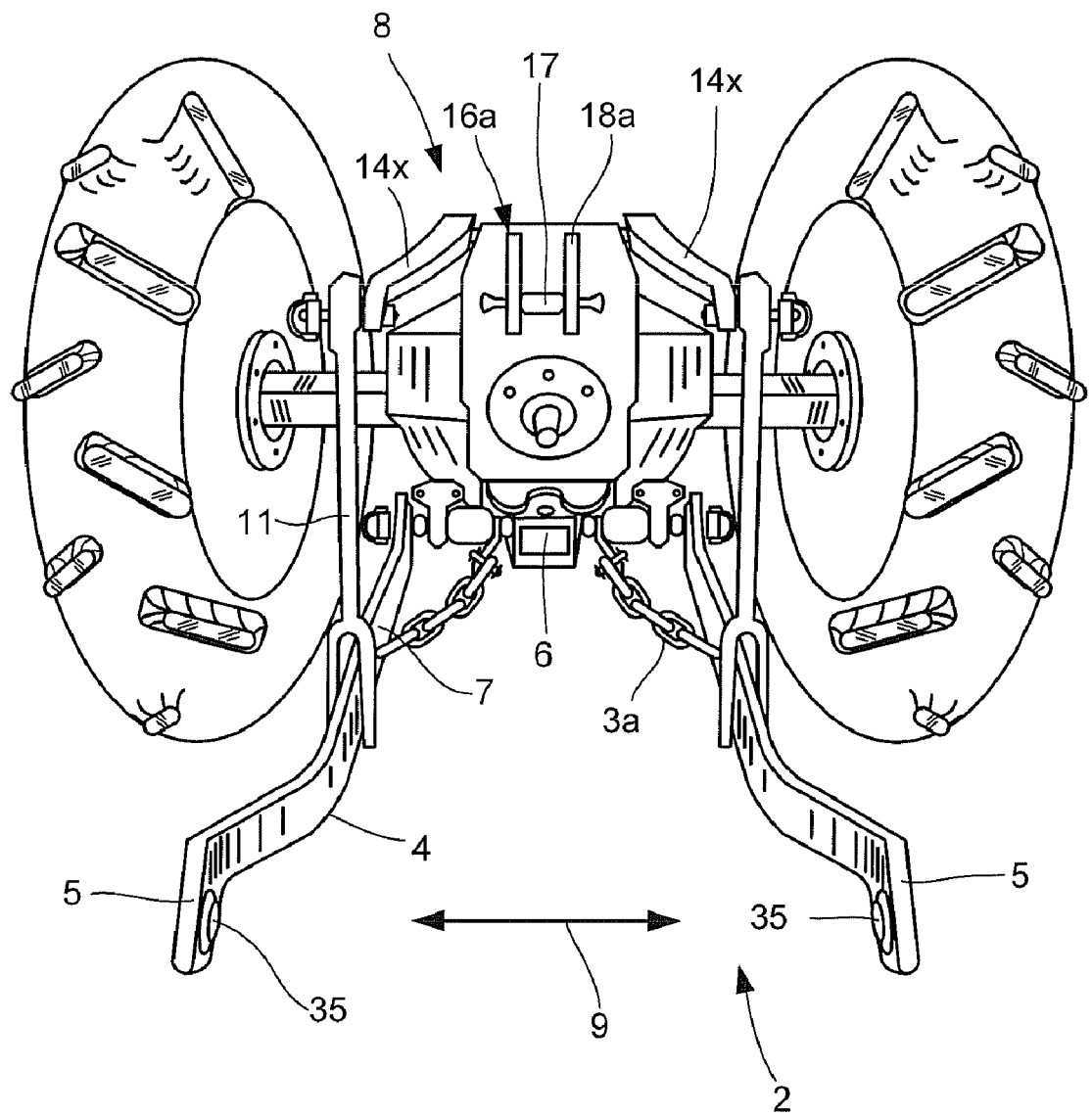
FIG. 1 is a perspective view of a three-point hitch provided to a tail section of an agricultural tractor.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 3A:
FIG. 3a is a top view of a trailer connector provided with a plurality of male extensions in accordance with an aspect of the invention, wherein a lateral distance between connectors is fixed.
Figure 3B:
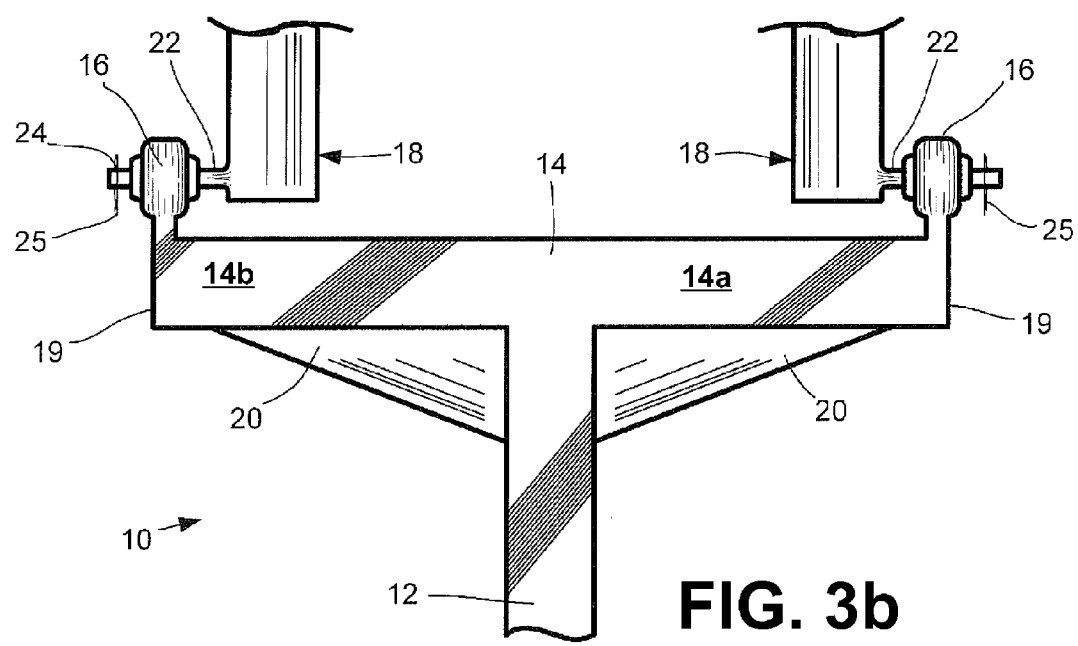
FIG. 3b is a top view illustrating cooperation between male extensions of a trailer connector and connectors provided to a hitch according to an aspect of the present invention.

An embodiment of a hitch 10 for towing an agricultural implement such as a plow, hay baler, spreader, mower and other such trailers having a feature for establishing a three-point connection with a towing vehicle licensed to navigate public roadways is shown in FIG. 3b. Such an agricultural implement is referred to herein interchangeably as an implement and a trailer, but regardless of the terminology, the agricultural implement includes a connector 18 such as that shown in FIG. 3a, that also facilitates connection of the agricultural trailer to a hitch provided to an agricultural tractor 8 such as that shown in FIG. 1.

Figure 2A:
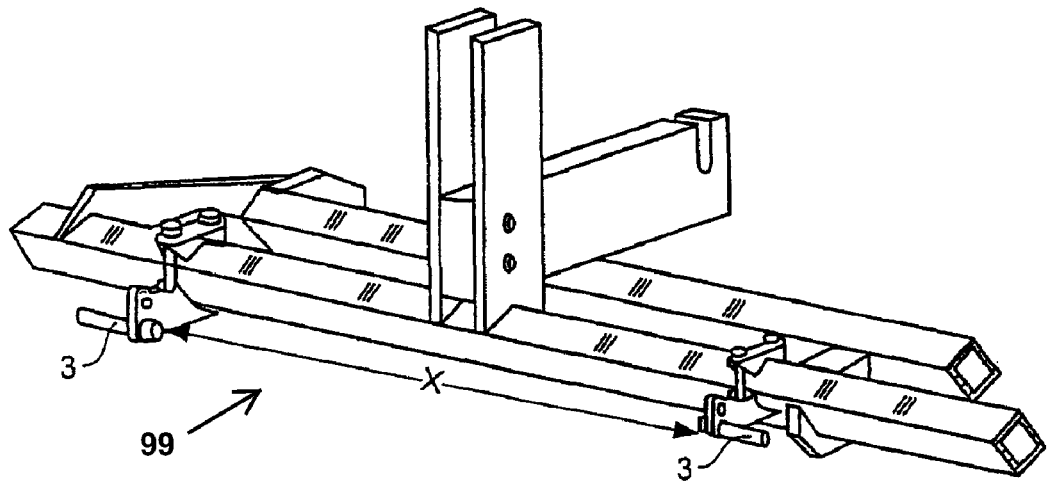
FIG. 2a is a perspective view of a connector portion of a two-point trailer/agricultural implement to be releasably coupled to an agricultural tractor.

The connector 18 shown in FIGS. 2a and 3a of the agricultural implement includes a pair of laterally extending male extensions 22 that typically extend outwardly, away from the connectors 18 of the trailer to facilitate attachment of the trailer to the three-point hitch 2 of the agricultural tractor 8. Each male extension 22 is separated from the other by a fixed distance X (FIG. 2a), a distance X that can vary from trailer to trailer. An aperture 24 (FIG. 3a) is formed in each male extension 22 through which a locking pin 25 (FIG. 3b) can be extended to minimize the likelihood that the male extensions 22 can be inadvertently removed from the trailer hitch 10 once coupled thereto as described in detail below. The locking pin 25 or other such device interferes with the removal of the male extension 22 from a pair of connectors 16 provided to the hitch 10 once the linkage between the agricultural implement and the hitch 10 is established. As shown in FIG. 3b, the male extension 22 extends through an aperture formed in the female connectors 16 supported by the support member 14. Once an extension 22 is inserted through each connector 16, the locking pin 25 can be inserted to extend through the aperture formed in the male extension 22 on an opposite side of the connector 16. The locking pin 25 inserted through the aperture 24 of the male extensions 22 interferes with the removal of the extensions 22 from their respective connectors 16.

Examples of a vehicle 82 (FIG. 7) licensed to navigate public roadways to which the hitch 10 can couple the agricultural trailer include, but are not limited to passenger vehicles such as pickup trucks, sport utility vehicles, long-haul tractors (commonly referred to as "semi tractors"), and the like. These vehicles are contrasted with the typical agricultural tractor 8, such as that illustrated in FIG. 1, in that they are typically licensed to navigate along public roadways for purposes of public transportation, are commonly used as modes of passenger transportation in everyday life, and have a faster top speed than the conventional agricultural tractor 8. Further, the vehicles 82 to which the hitch 10 of the present invention can be coupled each lack a dedicated, permanently-fixed, conventional three-point hitch 2 such as that provided to the tail section 6 of the agricultural tractor 8 in FIG. 1. However, the hitch 10 can be compatible with an existing tow package provided to the vehicle 82 such as a receiver marketed under the trade name Hidden Hitch®. Thus, the terminology "vehicles licensed to navigate public roadways" or "vehicle" is used herein to refer to motorized vehicles 82 other than agricultural tractors 8.

Figure 7:
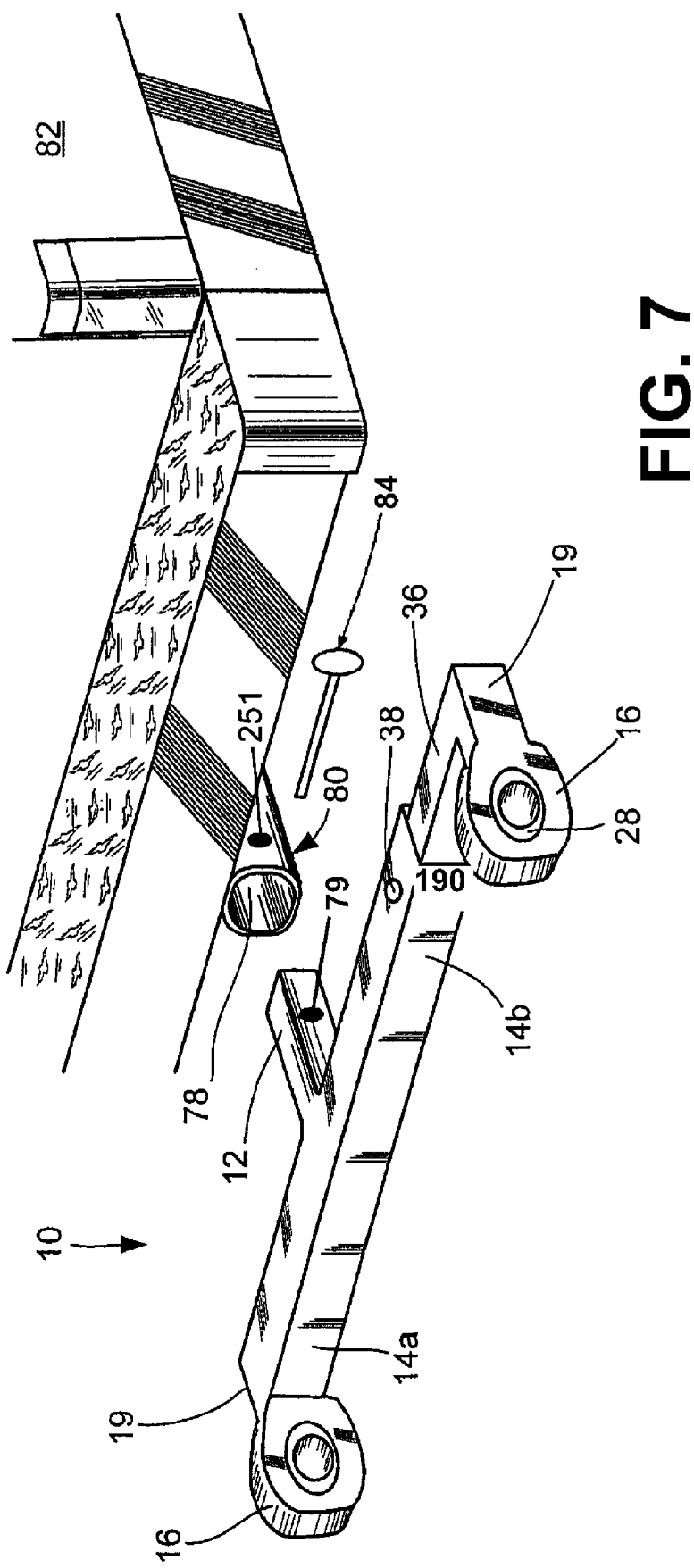
FIG. 7 is a perspective view of a hitch in accordance with an aspect of the invention positioned adjacent to a tail section of a vehicle licensed to navigate public roadways.

As shown in FIG. 3b, the hitch 10 includes a base member to be coupled adjacent to a tail section of the vehicle 82 for securing the hitch 10 to the vehicle 82. The base member is shown as an elongated, hollow shank 12 in FIG. 4a, having a generally rectangular cross-section shown in FIG. 3c that can be at least partially inserted into a hollow cavity 78 of a receiver 80 secured to the underside of the vehicle as shown in FIG. 7. The receiver 80 can be secured adjacent to a tail section of the vehicle 82 to a rigid, structural, load-withstanding member of the vehicle's frame that can withstand the forces imparted on the vehicle 82 by the agricultural implement while towing such a trailer. An example of a suitable receiver 80 for securing the hitch 10 to the vehicle is that marketed under the trade name Hidden Hitch® Class V Magnum Hitch Receiver by Algonquin Industries International, Inc. The Class V Magnum Hitch Receiver is but one illustrative example, and any suitably-configured assembly including a receiver 80 for connecting the hitch 10 to the vehicle and being rated in any classification or category is within the scope of the present invention, including but not limited to: class I assemblies having a rated gross trailer weight of up to 2,000 pounds and a tongue weight of up to 200 pounds; class II assemblies having a rated gross trailer weight of up to 3,500 pounds and a tongue weight of up to 300 pounds; class III assemblies having a rated gross trailer weight of up to 5,000 pounds and a tongue weight of up to 500 pounds; class IV assemblies having a rated gross trailer weight of up to 10,000 pounds and a tongue weight of up to 1,200 pounds; and class V assemblies having a rated gross trailer weight of up to 16,000 pounds and a tongue weight in excess of 1,200 pounds; and so on.

Figure 3C:
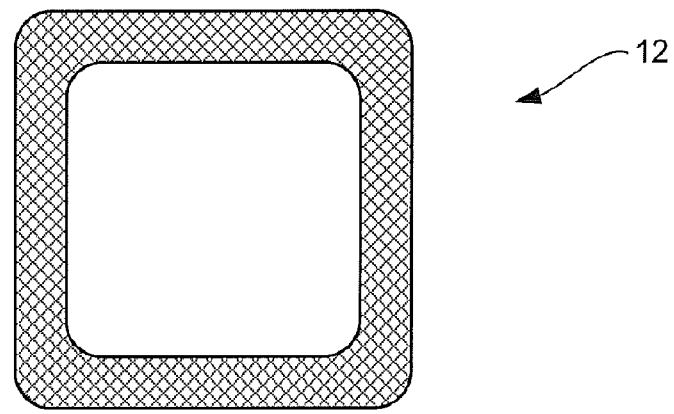
FIG. 3c is a cross-sectional view of an embodiment of a shank to be inserted into a receiver provided to a tow vehicle for coupling a hitch according to an aspect of the present invention to the tow vehicle.

A cross sectional view of the shank 12, as shown in FIG. 3c, has a generally rectangular cross section with rounded corners to approximate the interior dimensions of the hollow cavity 78 defined by the receiver 80. The close relationship between the external dimensions of the shank 12 and the internal dimensions of the hollow cavity 78 minimize lateral and vertical movement of the shank 12 within the hollow cavity 78. The shank 12, like other members of the hitch 10, can optionally be fabricated from ¼ inch steel, a steel alloy, or any other suitably strong material to withstand forces imparted thereon when coupling an agricultural trailer to a vehicle 82.

Figure 6:
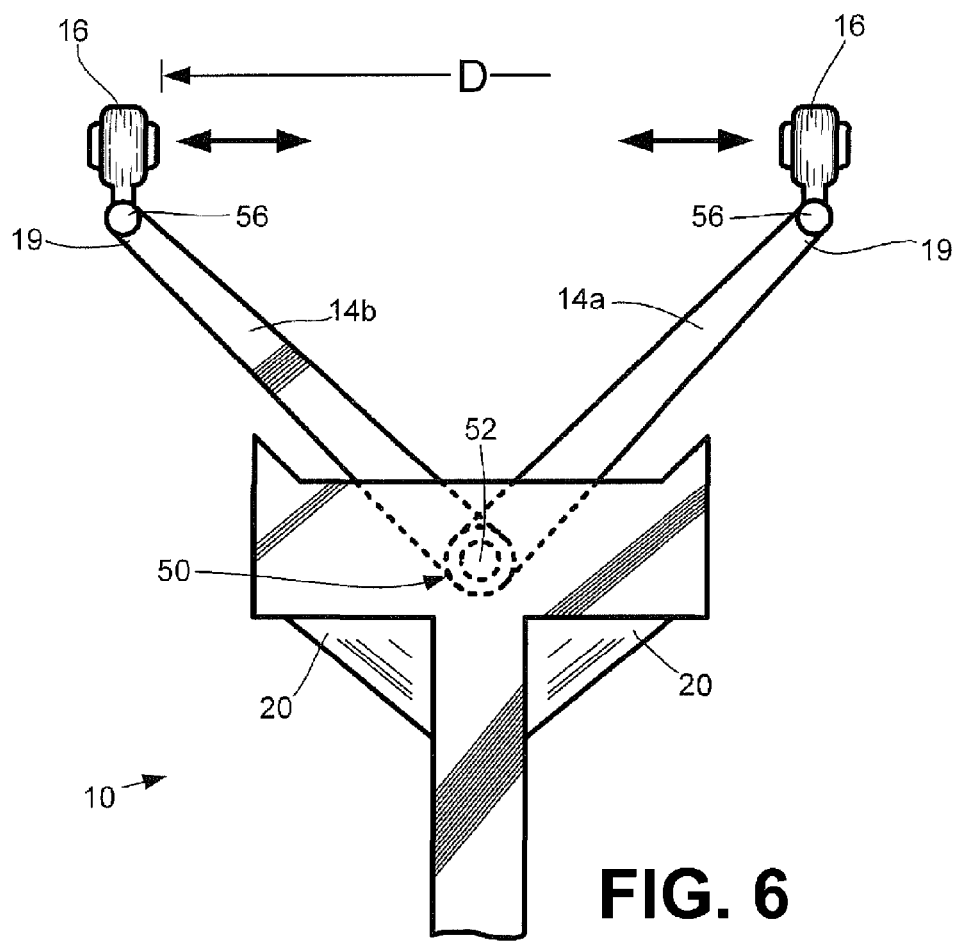
FIG. 6 is a top view of a hitch in accordance with an aspect of the invention, wherein both lateral arms forming a support member are pivotally adjustable to permit adjustment of a lateral distance between connectors.

A support member 14, also referred to and described herein as including one or more arm portions 14a, 14b, is coupled to the shank 12 such that it extends outwardly in opposite directions generally away from, and transverse to the shank 12. The support member 14 can be a single metallic extension as shown in FIG. 3b, having a generally rectangular cross section and extending in opposite directions generally away from, and transverse to the shank 12. For such an embodiment, the shank 12 is substantially centered between distal ends 19 of the support member 14. The portions of the support member 14 separated by the shank 12 can be considered as a plurality of arm portions 14a, 14b that both extend generally away from the shank 12, in opposite directions or merely in different directions as shown in FIG. 6 and discussed below. The support member 14 can optionally be formed as a monolithic unit, integrally formed with the shank 12 such that the shank 12 and arm portions 14a, 14b form a single, seamless unit. According to other embodiments, the arm portions 14a, 14b, the shank 12, or any combination thereof can be formed from a plurality of separate, individual segments coupled together by any suitable fastener.

Regardless of the configuration of the support member 14, a connector 16 is supported adjacent to each distal end 19 of the support member 14. Each connector 16 is cooperable with the male extension 22 extending from the trailer connector 18 (FIG. 3a) provided to the trailer to be towed to establish linkages between the hitch 10 and the trailer. The connector 18 provided to the trailer to be towed will be referred to from this point on as a "trailer connector 18." For embodiments where the support member 14 is formed from a plurality of arms 14a, 14b, a connector 16 is provided adjacent to a distal end 19 of each arm. A gusset 20 or other type of brace can optionally be installed to extend between the shank 12 and portions of the support member 14 to reinforce the support member 14, thereby maximizing the towing capacity of the hitch 10.

Figure 9:
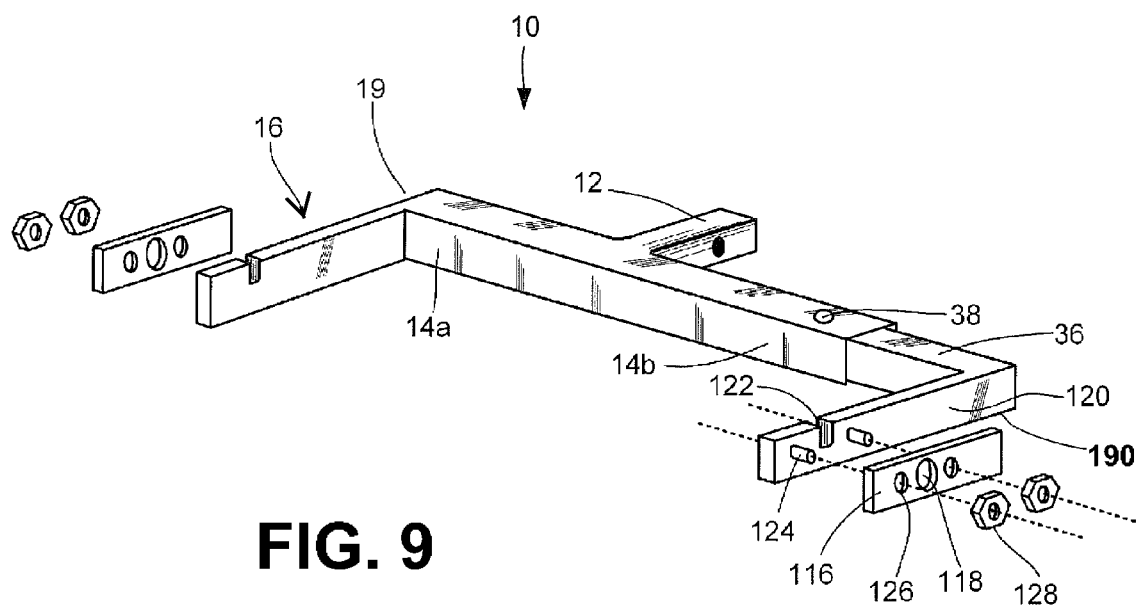
FIG. 9 is a perspective and partially exploded view of a hitch including a plate connector adjacent to each distal end of the support member in accordance with an embodiment of the present invention.

The connectors 16 supported adjacent to the distal ends 19 of the support member 14 in FIG. 3b are spaced a fixed lateral distance apart to cooperate with trailer connectors 18 having a similar spacing, such as the case where the hitch 10 is permanently attached to the agricultural trailer, or the position of at least one of the trailer connectors 18 is adjustable. Embodiments of the connector 16 provided adjacent the distal ends 19 of the support member 14 discussed herein can be independently selected from a female receptor such as a plate 116 (FIG. 9) with an aperture 118 formed therein, a ball-in-socket connector commonly referred to as a gimbal, and the like; and a male member such as a pin that is to extend through a female trailer connector 18, and the like. In any event, the trailer-connector sex is to be the opposite of that of the connector 16 provided to the hitch 10 to facilitate cooperation and the formation of linkages there between. But regardless of the sex of each of the connectors 16 and the trailer connectors 18, each connector 16 is compatible with its respective trailer connector 18 to form a linkage there between.

An embodiment of the connector 16, also referred to herein as a "gimbal," "gimbal connector" or gimbal-type connector, mentioned above is shown in FIG. 4b. The gimbal embodiment of the connector 16 includes a metal frame 26 defining a socket in which a metallic ball 28 is to be at least partially enclosed. The socket defined by the frame 26 has a generally-round aperture 29 on opposite lateral sides thereof. Such a shape can be described as a hollow metal sphere with two of its lateral sides truncated, or cut away. Thus, a cross-sectional shape of the socket taken along line 4c-4c, said cross-section being shown in FIG. 4c, includes an arcuate portion 30 defining the peripheral boundary of the socket for receiving the ball 28 therein. The diameter d1 of the aperture 29 located at each lateral side of the gimbal connector 16 is less than the largest diameter d2 between opposing arcuate portions 30 of the frame 26. Due to this difference between diameters d1, d2, the ball 28 can pivot within the socket, but can not escape through the aperture 29 formed at either side of the gimbal connector 16.

The ball 28 received in the socket is a generally-spherical metal ball 28 having a diameter that is approximately the same as, but slightly less than the largest interior diameter d2 of the socket measured between the arcuate portions 30 of the gimbal connector 16. The diameter of the ball 28, however, is larger than the diameter of the aperture 29 formed in each lateral side of the gimbal connector 16 to prevent removal of the ball 28 through said apertures 29. A generally-cylindrical passage extends entirely through the ball 28, forming an internal passage 27 through the ball 28. The male extension 22 of the trailer connector 18 is inserted into, and extends through the internal passage, and is prevented from being removed.

To form the gimbal connector 16, the ball 28 can be inserted through one aperture 29 in a lateral side of the frame 26 to be at least partially surrounded by the arcuate portions 30 of the socket. With the ball 28 resting in the socket, a metallic ring can be threadedly fastened, welded, or otherwise secured adjacent to the aperture 29 through which the ball 28 was inserted into the socket to limit the diameter d1 of the aperture. The ring restricts the size of the aperture 29 to a size suitable to prevent passage of the ball 28 there through. For example, the ring can reduce the diameter of the aperture 29 through which the ball 28 was inserted to a diameter d1 that is less than the outside diameter of the ball 28. Installed in this manner, the ball 28 can rotate at least partially around a plurality of axes within the socket without being removed from the socket.

Another embodiment of securing a ball 28 within a socket is to insert a suitably-sized ball 28 that can pass through at least one aperture 29 of the socket in a first orientation, but can't pass through the aperture 29 in a second orientation. Yet other embodiments include a ball 28 integrally formed within the socket such that the socket is formed as a single unit through laser etching; a socket formed from a plurality of components combined around the ball 28; and the like. But regardless of the method employed to secure the ball 28 within the socket, the ball 28 can rotate to accommodate movement of the trailer connector 18 while linked to the hitch 10 with the gimbal connector 16.

Other embodiments can optionally include a connector 16 other than the gimbal connector 16 provided adjacent the distal ends 19 of the support member 14. An example of such an alternate connector 16 includes a metal plate 116 with an aperture 118 formed therein, as shown in the embodiment appearing in FIG. 9. A catch arm 120 extends rearward, generally away from the vehicle 82 to which the hitch 10 is coupled in the direction of the trailer to be coupled to the vehicle 82. A recess 122 is formed in the catch arm 120 for receiving the male extension 22 of the trailer connector 18. When the male extension 22 is disposed within the recess 122, the aperture 118 in the plate 116 can be aligned with the male extension 22 and the plate 116 slid over the male extension 22 and placed adjacent to the catch arm 120. The plate 116 is also oriented such that two threaded alignment pins 124 projecting outwardly from the catch arm 120 extend through apertures 126 formed in the plate 116 when the plate 116 is disposed adjacent to the catch arm 120. A threaded fastener 128 such as a hexagonal bolt is threadedly secured to each alignment pin 124, thereby maintaining the plate 116 in a position adjacent to the catch arm 120 and securing the male extension 22 of the trailer connector 18 within the recess 122. Although the gimbal and plate embodiments of the connector 16 have been discussed in detail, it is to be noted that the present invention includes various other embodiments of the connector that can be provided adjacent to the distal ends 19 of the support member 14 to selectively secure the trailer to he hitch 10.

Figure 4A:
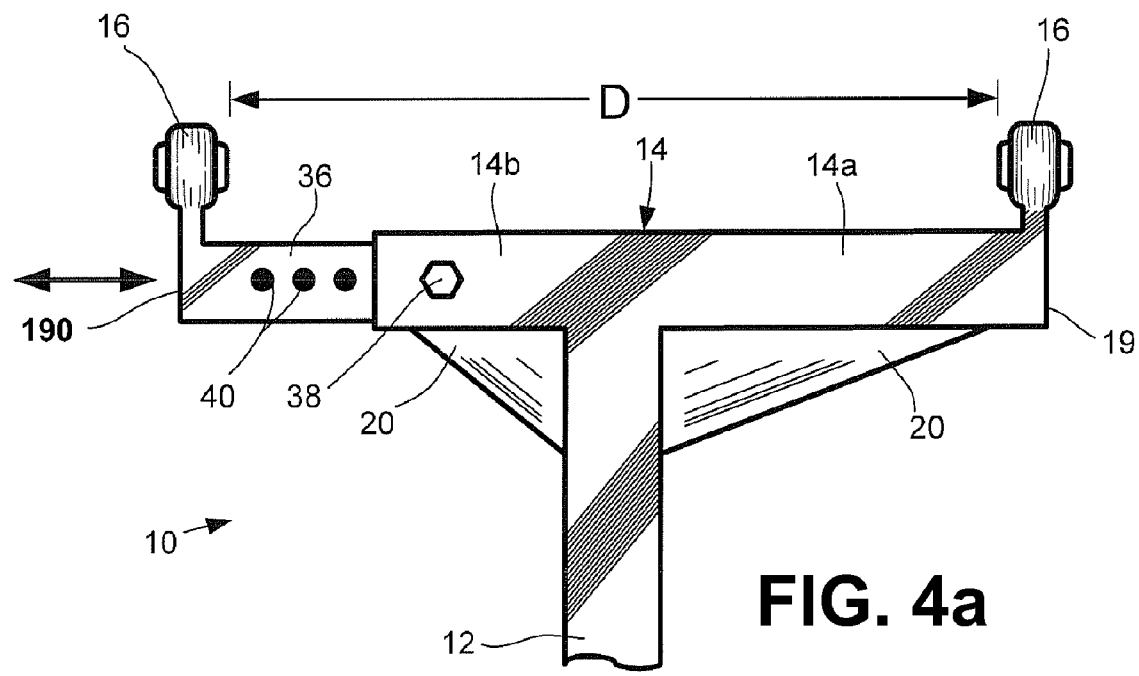
FIG. 4a is a top view of a hitch in accordance with an aspect of the invention, wherein a portion of a support member is adjustable to permit adjustment of a lateral distance between connectors.
Figure 4B:
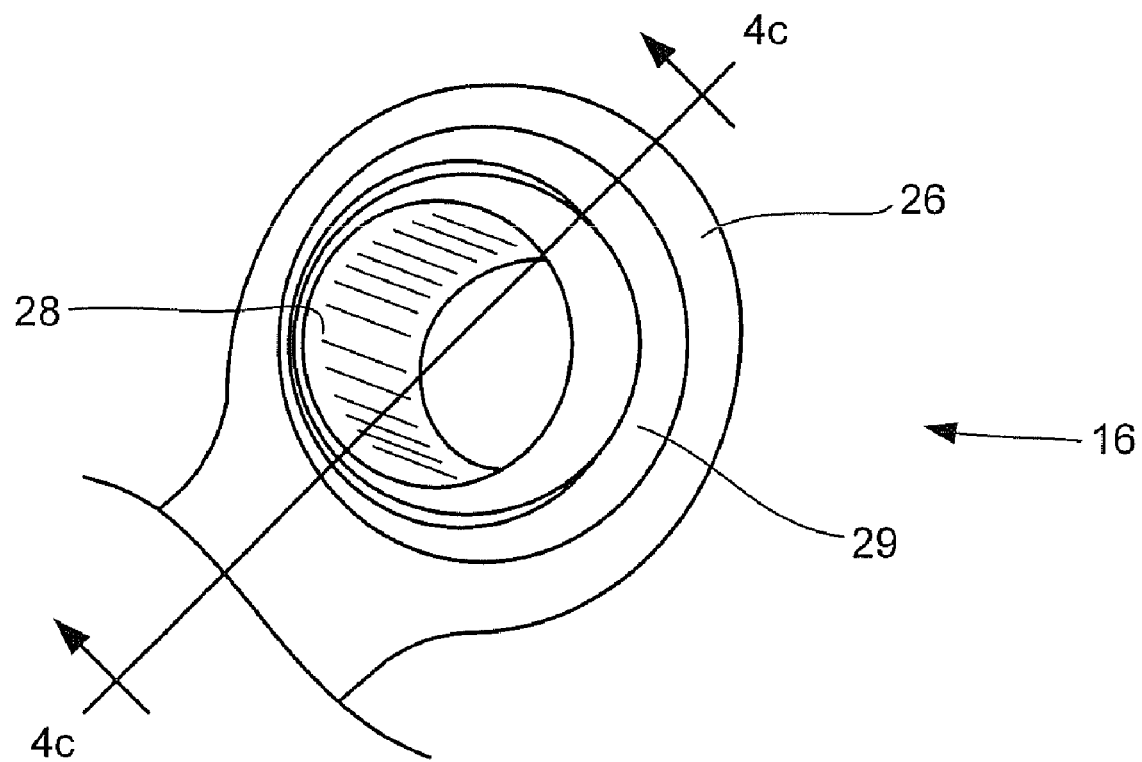
FIG. 4b is a perspective view of a gimbal-type connector according to an aspect of the present invention.
Figure 4C:
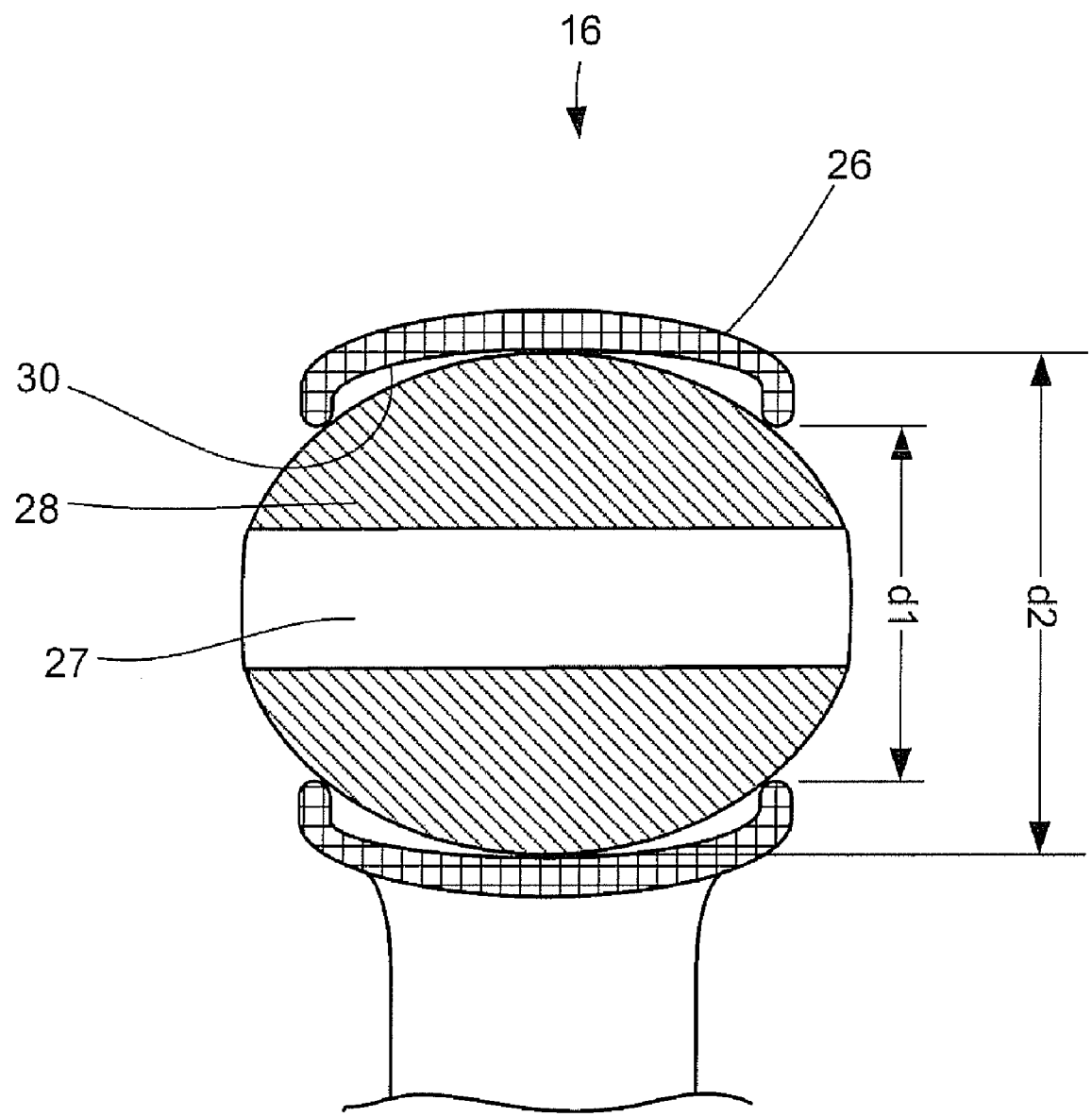
FIG. 4c is a cross-sectional view of the gimbal-type connector shown in FIG. 4b taken along line 4c-4c.

FIG. 4a shows an alternate embodiment of the hitch 10, wherein a lateral distance D between the connector 16 provided adjacent to each distal end 19 of the support member 14 is adjustable. As shown, one portion 14a of the support member 14 has a fixed length and includes a connector 16 compatible with a trailer connector 18 provided adjacent to a distal end 19 thereof. This connector 16 is separated a fixed lateral distance from the shank 12. Just as before, the connector 16 can optionally be a gimbal connector 16, and a gusset 20 can optionally be installed between this portion of the support member 14 and the shank 12 to which it is coupled to maximize the strength and towing capacity of the hitch 10.

Another portion 14b of the support member 14 allows lateral adjustment of the connector 16 supported adjacent to the distal end of that portion 14b. The portion 14b of the support member 14 includes a hollow arm defining a travel path along which a telescopically-extendable inner segment 36 shown in FIG. 4a can travel. The inner segment 36 supports a connector 16 with an adjustable position that can be adjusted as the inner segment 36 is telescopically extended from, and inserted into the stationary portion 14b of the support member 14 to extend or reduce the lateral distance D between the connector 16 provided adjacent to each distal end 19 of the support member 14. A locking pin 38 can extend at least partially through the stationary portion 14b of the support member 14 to interfere with the removal or insertion of the inner segment 36 relative to the stationary portion 14b. According to one embodiment, the inner segment 36 is provided with a plurality of adjustment apertures 40 formed therein for receiving the locking pin 38 when the locking pin 38 is extended at least partially through the stationary portion 14b of the support member 14. And just as before, a gusset 20 or other brace can optionally be installed between the stationary segment 14b and the shank 12 to strengthen the hitch 10 and maximize its towing capacity.

The locking pin 38 can optionally be spring biased into the stationary portion 14b so that the distance D between the connectors 16 at opposite distal ends 19 of the support member 14 is normally locked. When adjustment of the lateral distance D between the connectors 16 is desired, the locking pin 38 can be manually pulled outwardly away from the stationary portion 14b of the support member 14 such that communication between the locking pin 38 and the inner segment 36 is discontinued. The desired lateral distance D adjustment is performed by extending the desired length of the inner segment 36 from, or inserting the desired length of the inner segment 36 into the stationary portion 14b. The aperture 40 in the inner segment 36 that is closest to the desired adjustment is aligned with the locking pin 38 of the stationary portion 14b, and the locking pin 38 released. Once the locking pin 38 is released, the biasing force of the spring urges the locking pin 38 inward to reestablish communication with the inner segment 36 and prevent lateral movement of the inner segment 36 relative to the stationary portion 14b.

Alternate embodiments of the present invention can include a threaded locking pin 38 instead of a spring-biased locking pin 38. According to these alternate embodiments, the locking pin 38 can take the form of a bolt, a screw, or any other threaded fastener. The position of the locking pin 38 relative to the inner segment 36 can be accomplished by rotating the locking pin 38 clockwise and counterclockwise to insert and retract the locking pin 38 relative to the inner segment 36, respectively. Rotating the locking pin 38 causes an inward surface of the locking pin 38 to contact an external surface of the inner segment 36 within the stationary portion 14b of the support member 14. Communication between cooperable threaded portions provided to the locking pin 38 and the stationary portion 14b facilitate the insertion and removal of the locking pin 38 from the stationary portion 14b of the support member 14. The threaded locking pin 38 can be threadedly inserted into, and removed from the stationary portion 14b of the support member 14 with the inner segment 36 in any position relative to the stationary portion 14b to establish the desired lateral distance D between the connectors 16. Because of this flexibility in inserting and removing the threaded locking pin 38, the inner segment 36 can be infinitely adjusted relative to the stationary portion 14b, instead of between discrete, predetermined adjustment apertures 40.

Although the spring-biased and threaded locking pins 38 have been described above, it should be noted that the locking pin 38 can be independent of the stationary portion 14b. For instance, the locking pin 38 can be a free pin that can be completely removed and inserted into the stationary segment 14b as desired to facilitate and prevent adjustment of the distance D, respectively, as described below with respect to FIG. 4d.

Figure 5:
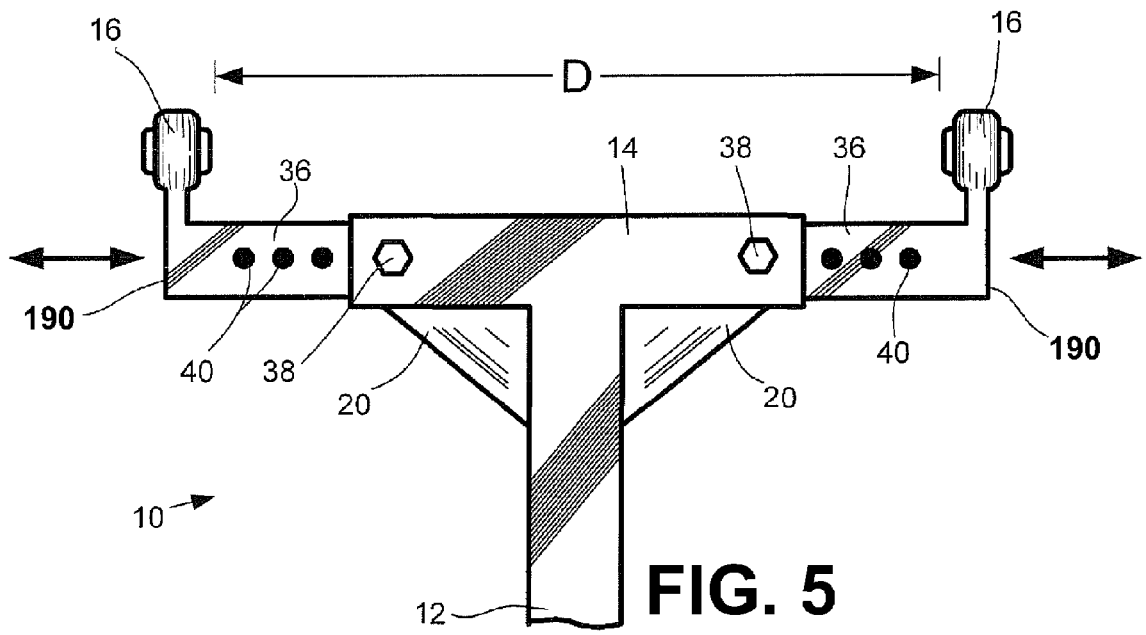
FIG. 5 is a top view of a hitch in accordance with an aspect of the invention, wherein both portions of a support member are adjustable to permit adjustment of a lateral distance between connectors.

FIG. 5 schematically illustrates another embodiment including a support member 14 with two laterally adjustable connectors 16 supported adjacent distal ends 19 thereof. The lateral distance D between the connectors 16 can be adjusted as desired to accommodate trailers with trailer connectors 18 separated by different distances. As shown, each portion 14a, 14b of the support member 14 receives a telescopically-adjustable inner segment 36 that is telescopically extendable from within stationary portions 14a, 14b of the support member 14. Each inner segment 36 supports a connector 16 at a laterally exposed, distal end 190 thereof and can be telescopically extended from, or inserted into its respective stationary portion 14a, 14b of the support member 14 to extend or reduce the lateral distance D separating the connectors 16. Analogous to other embodiments disclosed herein, a locking pin 38 can extend at least partially through the stationary portions 14a, 14b of the support member 14 to interfere with the removal from, and the insertion of the inner segments 36 into their respective stationary portion 14a, 14b. Each inner segment 36 can be provided with a plurality of adjustment apertures 40 formed therein for receiving the locking pin 38 extending at least partially through the respective stationary portion 14a, 14b of the support member 14. A gusset 20 or other brace can optionally be installed between one or both of the stationary portions 14a, 14b and the shank 12 to strengthen the hitch 10 and maximize its towing capacity.

Although the support member 14 is described above as receiving an inner segment 36, the present invention is not so limited, and instead, can include telescopically extendable segments including an outer member that can be telescopically adjusted over the portions 14a and/or 14b of the support member 14. Further, the adjustable segment(s) 36 coupled to the support member 14 is not necessarily limited to being telescopically adjustable. Other embodiments include translatable segments, infinitely adjustable segments, and other adjustable segments that can be adjusted relative to the support member 14 to vary the lateral distance D separating the connectors 16. Yet other embodiments include: a track formed along the support member 14 in which at least one of the connectors 16 can be independently adjusted relative to the other to vary the lateral distance there between; a plurality of receivers distributed along the support member 14 for selectively coupling at least one of the connectors 16 at desired positions to the support member 14; and the like.

Use of an embodiment of the present invention is described with reference to FIG. 7. As shown, the lateral distance between the connectors 16 supported adjacent opposite distal ends 19 of the support member 14 is accomplished via telescopic adjustment of one inner segment 16 that is telescopically adjustable relative to a stationary portion 14b of the support member 14. The connector supported adjacent to the distal end 19 of the other stationary portion 14a of the support member 14 is at a fixed lateral distance from the shank 12. The shank 12 of the hitch 10 is inserted into the hollow interior passage 78 of the receiver secured to the underside of the vehicle adjacent to a tail section of the vehicle. A pair of apertures 79 formed in opposite sides the shank 12 is aligned between a pair of similarly-sized apertures 251 formed in the sides of the receiver 80, and a locking pin 84 is inserted to extend through all four apertures. The communication between the locking pin and all four apertures releasably secures the hitch 10 to the vehicle. A secondary cotter-type pin (not shown) can be inserted through the portion of the locking pin 84 that extends beyond the receiver to minimize the likelihood that the locking pin 84 will be removed when said removal is not desired.

With the hitch 10 secured to the vehicle, the connectors 16 supported adjacent to the distal ends 19 of the support member 14, which in this example are gimbal connectors 16, are positioned in a plane that is generally parallel to the ground on which the vehicle is resting. The lateral distance D (FIG. 4a) between the connectors 16 referred to herein is the distance in the connector plane that separates the connectors 16 from each other. Prior to positioning the connectors 16 of the hitch 10 adjacent to the trailer connectors 18, this lateral distance D between the connectors 16 is maximized, or otherwise increased to a distance that is greater than a distance between the outermost portions of the male extensions 22 of the trailer connectors 18.

With the connectors 16 properly positioned, the vehicle can be backed into close proximity to the trailer such that the male extensions 22 of the trailer connector 18 are positioned between the connectors 16 of the hitch 10. In this position, each of the male extensions 22 is generally aligned along a common axis with the internal passage 27 (FIG. 4c) extending through the ball 28 of the respective connector 16 to which it is to be linked. If necessary, the ball 28 of each connector 16 can be rotated within its socket to achieve this proper alignment and minimize the precision of the alignment required to connect the trailer to the hitch 10.

Once proper alignment of the male extensions 22 of each trailer connector 18 with the connectors 16 of the hitch 10 has been achieved, communication between the locking pin 38 or other locking mechanism and the inner segment 36 is then terminated to permit relative movement of the inner segment 36 and the stationary portion 14b of the support member 14. The inner segment 36 is telescopically inserted into the portion 14b of the support member 14 to slide the internal 27 passage of the ball 28 of the gimbal connector 16 over the male extension 22 of the trailer connector 18. The locking pin 38 or other locking mechanism is then replaced to reestablish communication between the locking pin 38 and the inner segment 36, thereby maintaining the relative position of said inner segment 36 and the stationary portion 14b. A secondary pin 25 (FIG. 3b) can then optionally be inserted into an aperture 24 formed in the male extensions 22 of the trailer connector 18 to interfere with the removal of the male extensions 22 from the connectors 16. With communication between the connectors 16 and the trailer connectors 18 established to form linkages there between, the three-point trailer is hitched to the vehicle 82 to be towed.

Another embodiment of the present invention in shown schematically in FIG. 6. Again, just as in previous embodiments, the lateral distance between the connectors 16 is adjustable to facilitate the establishment of linkages between those connectors 16 and trailer connectors 18. However, each connector 16 is supported adjacent to a distal end 19 of an arm portion 14a, 14b that is pivotally coupled to the shank 12. The pivotal connection can be established with a hinge 50 that includes an interior passage defined by coaxially-aligned metal loops protruding from each arm 14a, 14b and at least one metal loop coupled to the shank 12. A metal hinge pin 52 extends through the interior passage to pivotally couple the arm portions 14a, 14b to the shank 12. A similar hinge 56 can optionally be provided adjacent to the distal end 19 of each arm portion 14a, 14b to pivotally couple the connectors 16 to the arm portions 14a, 14b. The pivotal connection between the connectors 16 and the arm portions 14a, 14b allows for adjustment of the connector 16 position when establishing a linkage between the connectors 16 and the trailer connectors 18.

Just as with the previous embodiments, the connector 16 provided adjacent to the distal end 19 of each arm portion 14a, 14b can be independently selected from a female receptor such as a metal plate with an aperture formed therein, a gimbal connector 16, and the like; and a male member such as a pin that is to extend through a female trailer connector 18, and the like. In any event, the sex of each trailer-connector 18 is to be the opposite of that of the respective connector 16 provided to the hitch 10 to facilitate cooperation and the formation of linkages there between. Regardless of the sex of each of the connectors 16 and the trailer connectors 18, each connector 16 is compatible with its respective trailer connector 18 to form a linkage there between.

In use, the embodiment of the hitch 10 shown in FIG. 6 can be secured within a receiver 80 secured to the underside of the vehicle 82 adjacent the vehicle's tail section in a manner similar to that described above with respect to FIG. 7. The shank 12 of the hitch 10 is inserted into the interior passage 78 of the receiver 80 secured to the underside of the vehicle 82. The pair of apertures 251 formed in opposite sides the shank 12 are aligned between a pair of similarly-sized apertures 251 formed in opposite sides of the receiver 80, and a locking pin 84 is inserted to extend through all four apertures 79, 251. The communication between the locking pin 84 and all four apertures 79, 251 releasably secures the hitch 10 to the vehicle 82. A secondary pin (not shown) can be inserted through the portion of the locking pin 84 that extends beyond the receiver 80 to minimize the likelihood that the locking pin 84 will be removed when said removal is not desired.

With the hitch 10 secured to the vehicle, the connectors 16 supported adjacent to the distal end 19 of each arm portion 14a, 14b, which in this example are gimbal type connectors 16, are positioned in a plane that is generally parallel to the ground on which the vehicle is resting. The lateral distance D (FIG. 6) between the connectors 16 referred to in this discussion is the distance in the plane of connectors 16 that separates the connectors 16 from each other. Prior to positioning the connectors 16 of the hitch 10 adjacent to the trailer connectors 18, the lateral distance D between the connectors 16 is maximized, or otherwise increased to a distance that is greater than a lateral distance between the outermost portions of the male extensions 22 of the trailer connectors 18. To maximize this lateral distance, the arm portions 14a, 14b are pivoted away from each other until they reach a terminal position.

With the connectors 16 properly positioned, the vehicle 82 (FIG. 7) can be backed into close proximity to the trailer such that the male extensions 22 (FIG. 3a) of the trailer connector 18 are positioned between the connectors 16 of the hitch 10. In this position, each of the male extensions 22 is generally aligned along a common axis with the internal passage 27 (FIG. 4c) extending through the ball 28 of the respective connector 16 to which it is to be linked. If necessary, the ball 28 of each connector 16 can be rotated within its socket to achieve this proper alignment.

Once proper alignment of the male extensions 22 of each trailer connector 18 with the connectors 16 of the hitch 10 has been achieved, one arm portion 14a can be pivotally adjusted to slide the internal passage 27 in the ball 28 of one connector 16 over the male extension 22 of the corresponding trailer connector 18. A secondary pin 25 (FIG. 3b) can be inserted to extend through a portion of the male extension 22 protruding beyond the ball 28 of that connector 16. Next, the other arm portion 14b can be pivotally adjusted to position the other male extension 22 of the trailer connector 18 within the internal passage 27 of the ball 28 provided to the other connector 16. Again, a secondary pin 25 can be inserted into an aperture 24 formed in the portion of the male extension 22 of the other trailer connector 18 that extends beyond the ball 28 to interfere with the removal of the other male extension 22 from the other connector 16. With communication between the connectors 16 and the trailer connectors 18 established to form linkages there between, the three-point trailer is hitched to the vehicle 82 to be towed.

Figure 8:
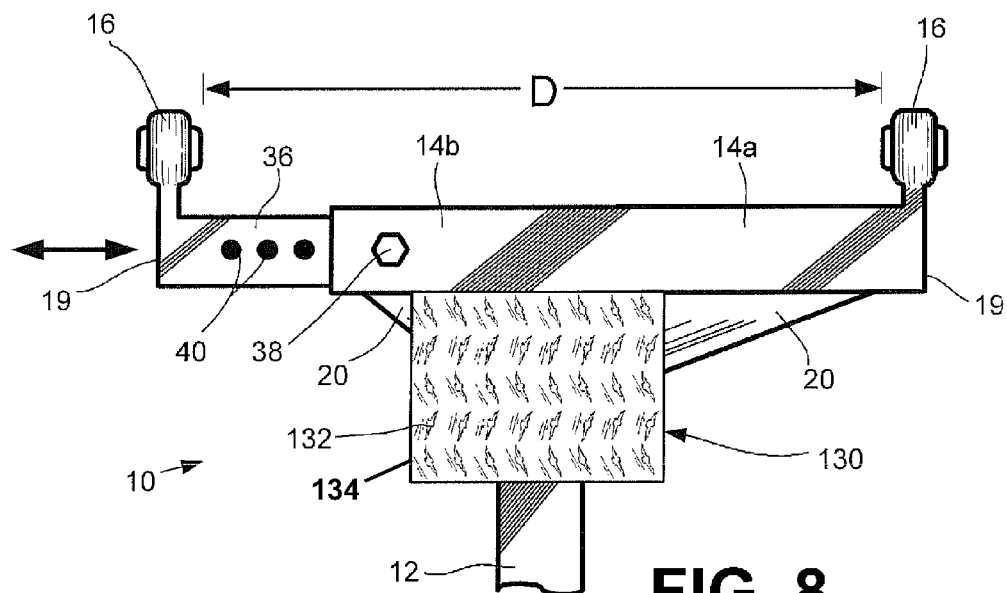
FIG. 8 is a top view of a hitch including a step in accordance with an aspect of the invention, wherein a portion of a support member is adjustable to permit adjustment of a lateral distance between connectors.

In addition to facilitating the releasable connection of the trailer connector 18 to the vehicle 82, the trailer hitch 10 can optionally include a step 130 as shown in FIG. 8 to support a person adjacent to the tail section of the vehicle 82. The step 130 can include a substantially planar steel or other suitably-rigid metal plate 134 coupled to the support member 14, the shank 12, the gusset 20, or any combination thereof. A traction enhancing surface 132 such as a plurality of protrusions, diamond plating, grit paper, and the like can optionally be provided to a top surface of the plate 134 on which the person can stand. The traction enhancing surface 132 maximizes traction experienced by a person standing on the plate 134 to minimize the likelihood of slipping.

Figure 10:
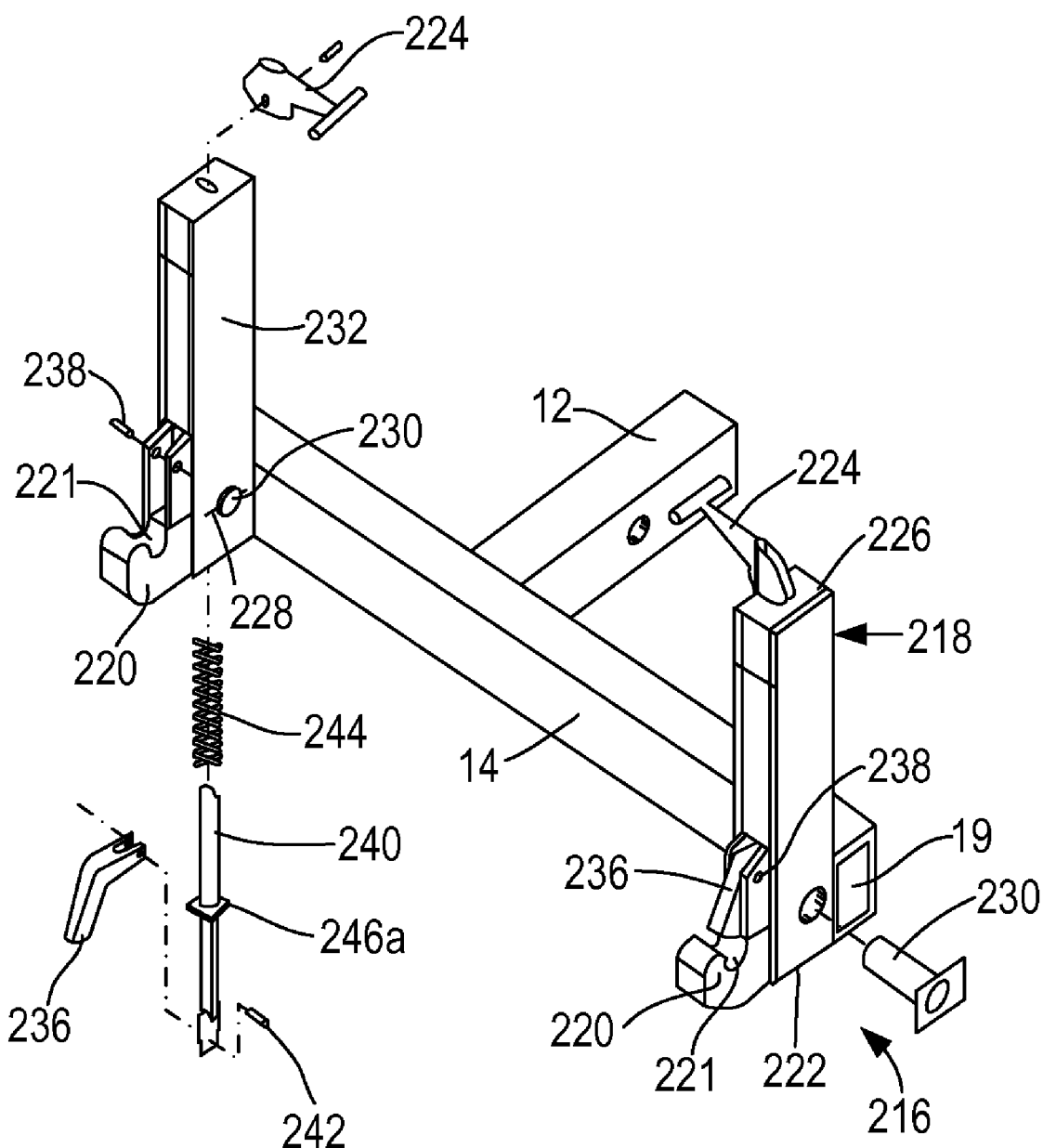
FIG. 10 is a perspective and partially exploded view of a hitch including a quick-hitch connector adjacent to each distal end of the support member in accordance with an embodiment of the present invention.

FIG. 10 illustrates yet another embodiment a quick-hitch connector 216 supported adjacent to each distal end 19 of the support member 14, which again, is coupled to or integrally formed with the shank 12. Other embodiments of the connector 16 discussed above can optionally include the quick-hitch connector 216 for rapid coupling and decoupling of the trailer to the vehicle 82. The quick-hitch connector 216 includes an elongated housing 218 provided with a hook 220 adjacent to a lower end 222 and a pivotal handle 224 exposed adjacent to an upper end 226. The hook 220 can optionally be removed from the housing 218 by removing safety pin 228 from an inward portion of a hinge pin 230 that is extended through the housing 218 beyond an inward surface 232 of the housing 218. A channel 221 is defined by the hook 220 to receive the male extension 22 protruding from the trailer connector 18.

A latch 236 is pivotally coupled to the housing 218 to pivot about pin 238, and is adjustable between locked and release positions. A shaft 240 extends through an interior passage defined by the housing 218 between the handle 224 and a coupling 242 that couples the shaft 240 to the latch 236. A force imparted to adjust the position of the handle 224 is transmitted to the latch 236 through the coupling 242, thereby causing adjustment of the position of the latch 236. A spring 244 is compressed between the upper end of the housing 218 and a platform 246a extending outwardly from each shaft 240 to bias the handles 224 to their orientations when the latches 236 are in their locked position.

In use, the embodiment of the hitch 10 shown in FIG. 10 can be installed with the shank 12 disposed within the cavity 78 of the receiver 80 as described above. The vehicle 82, and accordingly, the hitch 10 is backed into position such that the channel 221 formed by the hook 220 is disposed approximately vertically beneath the male extensions 22 of the trailer connector 18. Each handle 224 is manually pivoted to a substantially vertical position, causing the latches 236 to pivot about the coupling 242 in a direction that exposes the channels 221 of the hooks 220 to the male extensions 22. The position in which the latches 236 are oriented when the channel 221 is exposed is referred to as the release position. The elevation of the trailer, or at least the trailer connector 18, can be lowered through the operation of a winch, hydraulics, or other mechanism provided to the trailer such that the male extensions 22 fall into the channels 221 and rest on the hooks 220. Once the male extensions 22 are so positioned, each handle 224 can once again be manually pivoted to a substantially horizontal orientation to allow each shaft 240 to fall and cause each latch 236 to pivot about coupling 242 towards their locked positions. With the latches 236 in their locked position, they conceal the channel 221 of each hook 220, along with a portion of the male extension 22 resting in each channel 221, thereby coupling the trailer to the vehicle 82 by preventing the male extensions 22 from exiting the channels 221.

Once the trailer has been relocated to the desired destination, the handle 224 can again be manually pivoted 224 to adjust the latches 236 to their release positions, in which they expose the male extensions 22 resting in the channels 221. With the male extensions 22 exposed, the elevation of the trailer, or at least the trailer connector 18, can be raised through the operation of a winch, hydraulics, or other mechanism provided to the trailer such that the male extensions 22 rise out of the channels 221.

Figure 11:
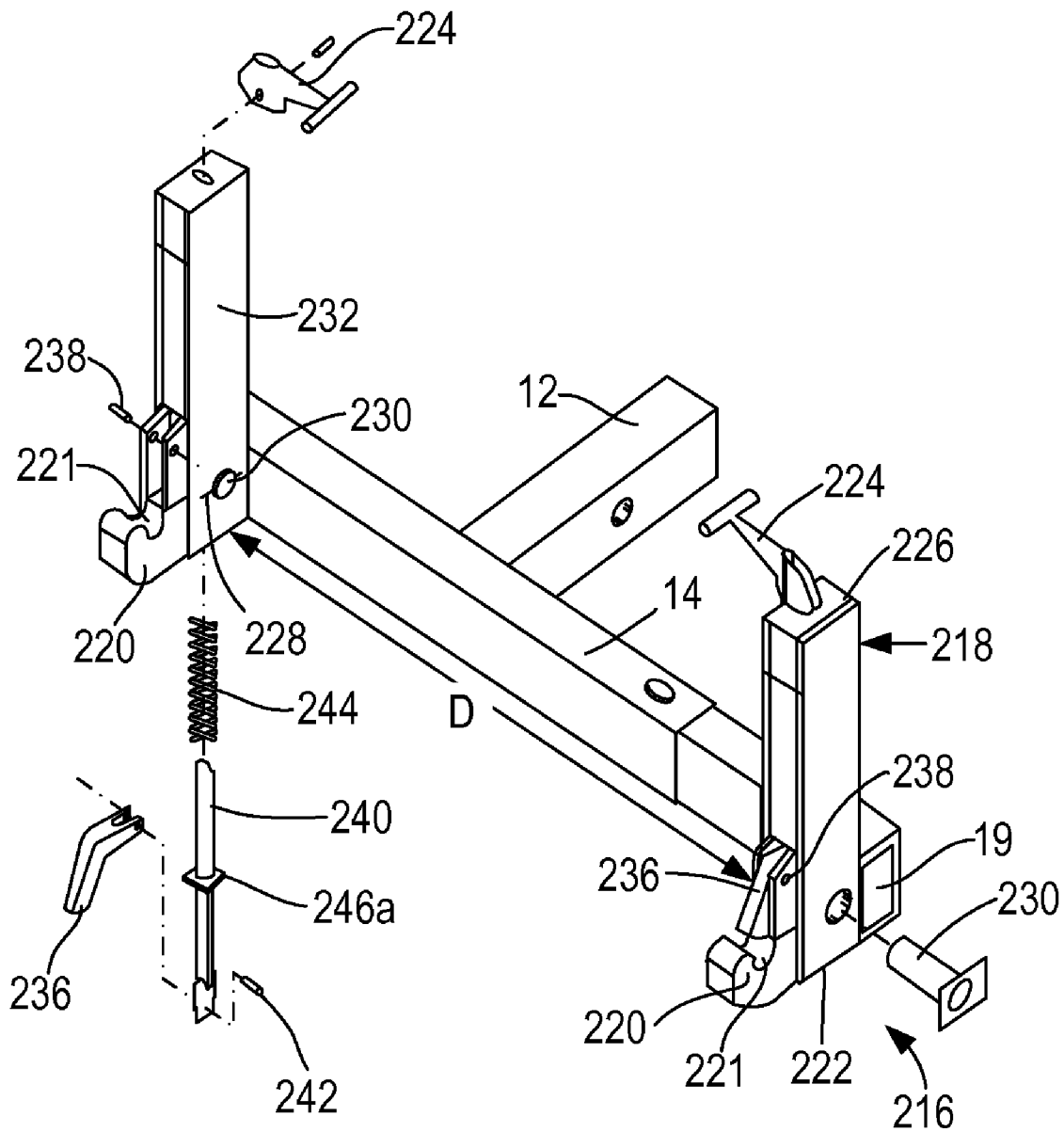
FIG. 11 is a perspective and partially exploded view of a hitch including a quick-hitch connector provided adjacent to each distal end of the support member in accordance with an embodiment of the present invention, wherein the lateral distance separating the quick-hitch connectors is adjustable.

Although the quick-hitch connectors 216 were shown in FIG. 10 as being provided adjacent to each distal end 19 of stationary portions of the support member, it is to be noted that one or both of the quick-hitch connectors 216 can optionally be provided adjacent to a distal end 19 of an adjustable inner segment 36 such as that described above. Such an embodiment is schematically illustrated in FIG. 11. As shown therein, the lateral distance D separating housing 218b from its counterpart is adjustable by telescopically inserting and removing the inner segment 36 relative to the support member 14 as described above. And similar to the preceding embodiments, the hitch 10 in FIG. 11 can be removably coupled to a vehicle 82 licensed to navigate public roadways by inserting at least a portion of the shank 12 into a recess 78 formed by a receiver 80. The shank 12 is removably secured within the recess 78 just as before by inserting a locking pin 84 (FIG. 7) through both an aperture 251 formed in the receiver 80 and an aperture 255 formed in the shank 12 that aligns with the aperture 251 in the receiver when the shank is inserted into the recess 78. According to such embodiments, the lateral distance D separating the quick-hitch connectors 216 can optionally be adjusted to accommodate trailers having male extensions 22 separated by a plurality of different lateral distances.

Co-pending U.S. patent application Ser. No. 11/788,885 to Slaubaugh et al., filed on Apr. 23, 2007, is incorporated in its entirety herein by reference.

Figure 12:
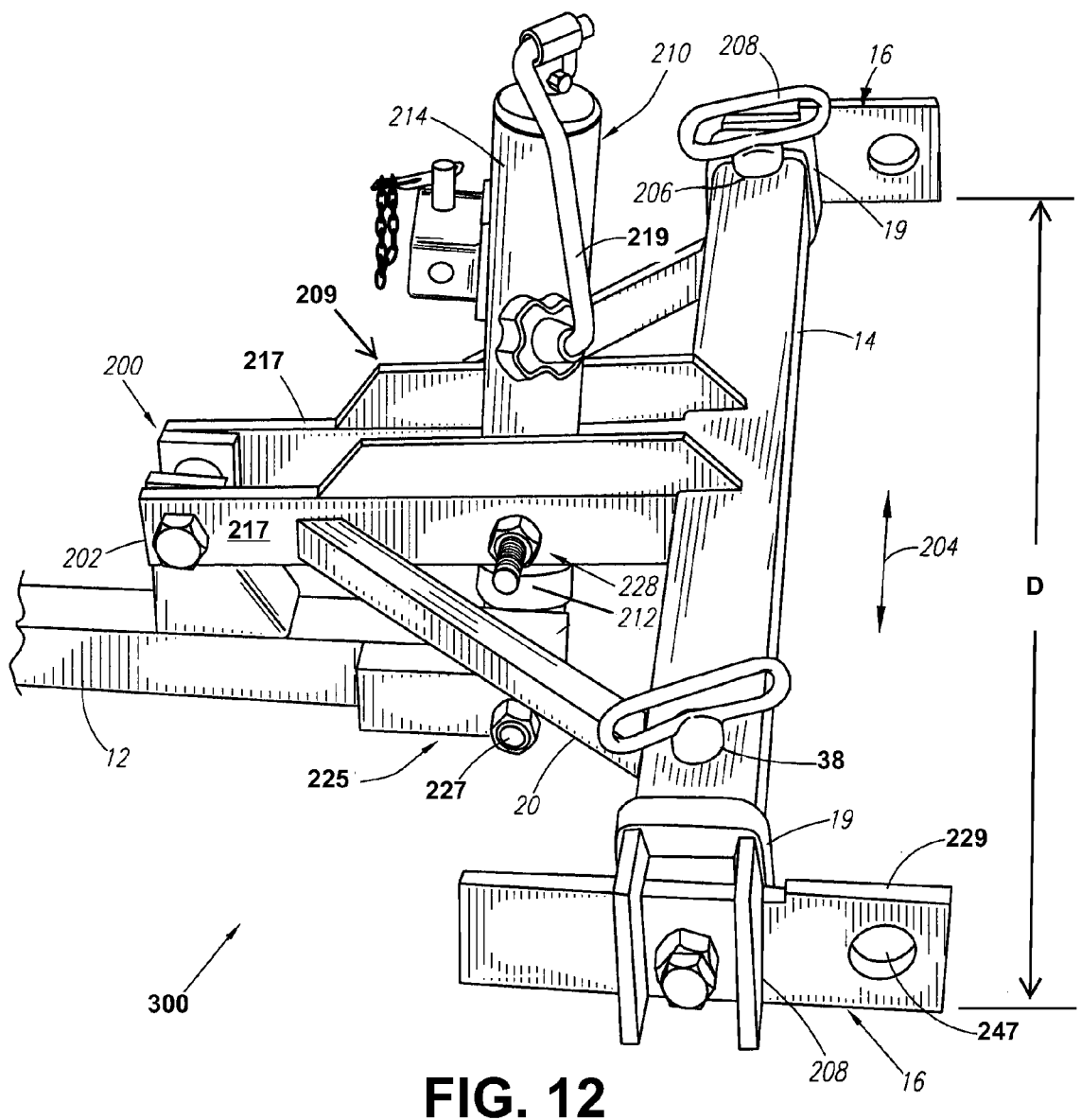
FIG. 12 is a perspective view of a hitch allowing substantially-vertical adjustment of a connector according to an embodiment of the present invention.

FIG. 12 shows a perspective view of a hitch 300 according to an alternate embodiment of the present invention. The hitch 300 is also to be utilized for coupling to a tow vehicle 82 (FIG. 7) an agricultural implement such as a plow, hay baler, spreader, mower and other such trailers that include at least two laterally-extending pins 3 or compatible features that cooperate with the lift arms 4 of a three-point connection of an agricultural tractor 8 (FIG. 1).

Figure 16:
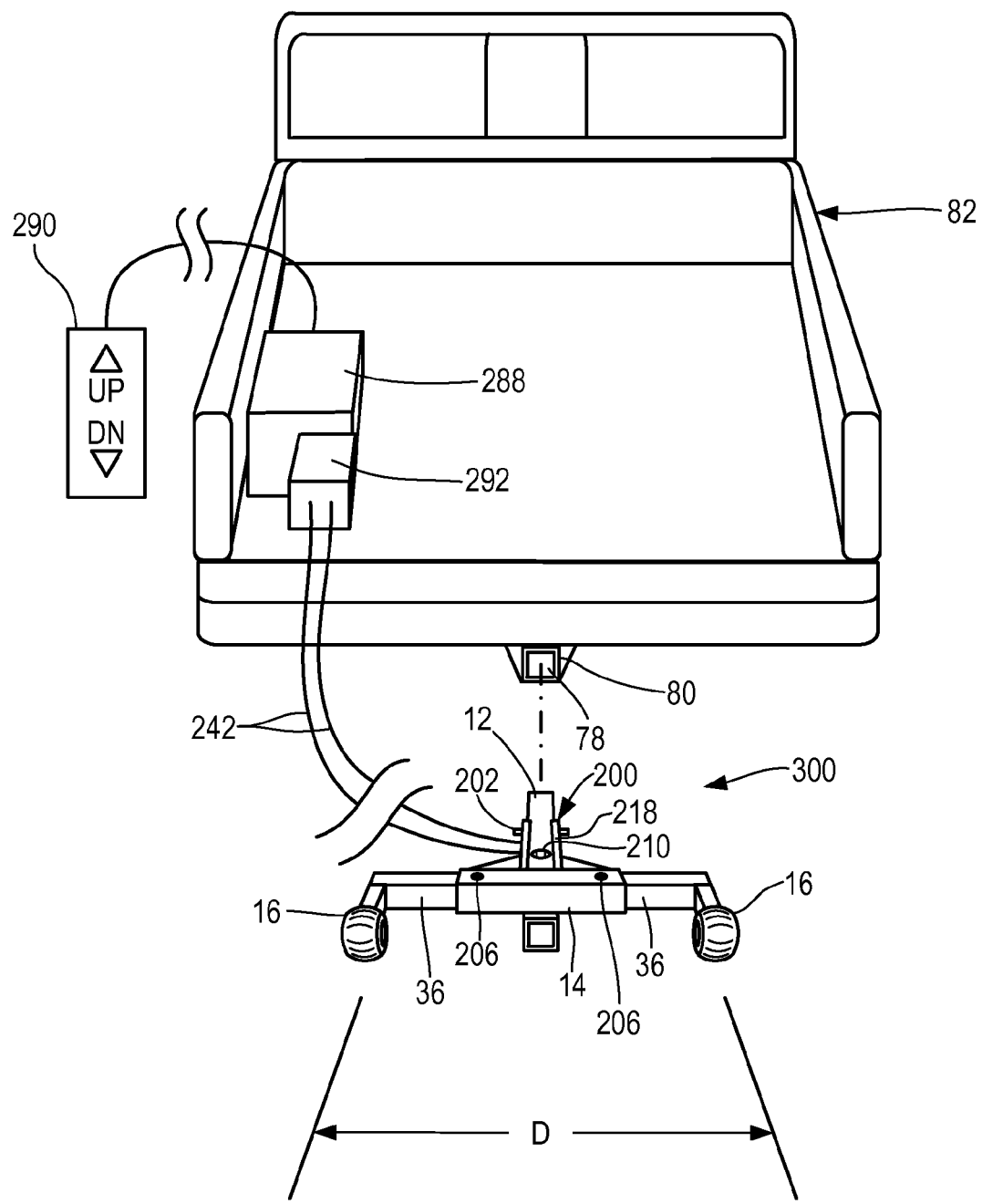
FIG. 16 is a schematic view of a hitch according to an embodiment of the present invention positioned for installation on a tow vehicle.

As shown in FIG. 12, the hitch 300 includes a base member, shown as the elongated shank 12, to be coupled adjacent to a tail section of a vehicle 82 (FIG. 16) in a manner similar to that discussed above with reference to FIG. 7. The shank 12 includes the generally rectangular cross-section shown in FIG. 3c, that can be at least partially inserted into a hollow cavity 78 of the receiver 80 secured to the underside of the vehicle 82 as shown in FIG. 16. The receiver 80 can be secured adjacent to a tail section of the vehicle 82 to a rigid, structural, load-withstanding member of the vehicle's frame that can withstand the forces imparted on the vehicle 82 by the trailer while towing such a trailer. An example of a suitable receiver 80 for securing the hitch 300 to the vehicle is that marketed under the trade name Hidden Hitch® Class V Magnum Hitch Receiver by Algonquin Industries International, Inc. The Class V Magnum Hitch Receiver is but one illustrative example, and assemblies including a receiver 80 in combination with a hitch 300 rated in any classification or category is within the scope of the present invention, including but not limited to: class I assemblies having a rated gross trailer weight of up to 2,000 pounds and a tongue weight of up to 200 pounds; class II assemblies having a rated gross trailer weight of up to 3,500 pounds and a tongue weight of up to 300 pounds; class III assemblies having a rated gross trailer weight of up to 5,000 pounds and a tongue weight of up to 500 pounds; class IV assemblies having a rated gross trailer weight of up to 10,000 pounds and a tongue weight of up to 1,200 pounds; and class V assemblies having a rated gross trailer weight of up to 16,000 pounds and a tongue weight in excess of 1,200 pounds; and so on.

The embodiment of the hitch 300 appearing in FIG. 12 also includes a connector assembly 209 that includes a transversely extending support member 14 that is pivotally coupled to the shank 12 by a hinge 200 and a pair of coupling arms 217 such that the support member 14 can be pivotally adjusted about the hinge 200 in a substantially-vertical direction relative to the shank 12, and accordingly, relative to the ground on which the vehicle 82 is resting. Adjusting the support member 14 in the substantially-vertical direction adjusts the elevation at which the support member 14 is located above the ground on which the vehicle 82 is resting. This adjustment of the support member 14 is said to be "substantially" vertical in direction, which can include a perfectly vertical adjustment, but also includes an adjustment of the support member's position along a somewhat arcuate path about a hinge pin 202 provided to the hinge 200, with the hinge pin 202 establishing the central axis about which the support member 14 pivots, while still adjusting the elevation of the support member 14 relative to the ground. Such adjustment is a bit arcuate to allow for adjustment of the support member 14 located at a fixed radial distance from the hinge pin 202.

The support member 14 extends outwardly in a transverse direction relative to, and away from the shank 12. The support member 14 can be a single metallic extension having a generally rectangular cross section and extending in opposite directions generally away from, and transverse to the shank 12, with the shank 12 being substantially centered between distal ends 19 of the support member 14. According to alternate embodiments and as described in detail above, the support member 14 can optionally be formed from a plurality of individual segments that are coupled to the shank 12 and extend generally away from the shank 12, in opposite directions or merely in different directions.

Regardless of the support member's configuration, the connector 16 of the present embodiment is also supported adjacent to each distal end 19 of the support member 14. Each connector 16 is cooperable with the male extension 22 extending from the trailer connector 18 provided to the trailer to be towed as described above with reference to FIGS. 3a and 3b to establish linkages between the hitch 300 and the trailer. For embodiments where the support member 14 is formed from a plurality of segments, a connector 16 is supported adjacent to a distal end 19 of each segment. A gusset 20 or other type of rigid brace member can optionally be installed to extend between the support member 14 and another portion of the hitch 300, such as coupling arm 217 as shown in FIG. 12, or from the shank 12, for example, to reinforce the support member 14, thereby maximizing the towing capacity of the hitch 300.

Figure 15:
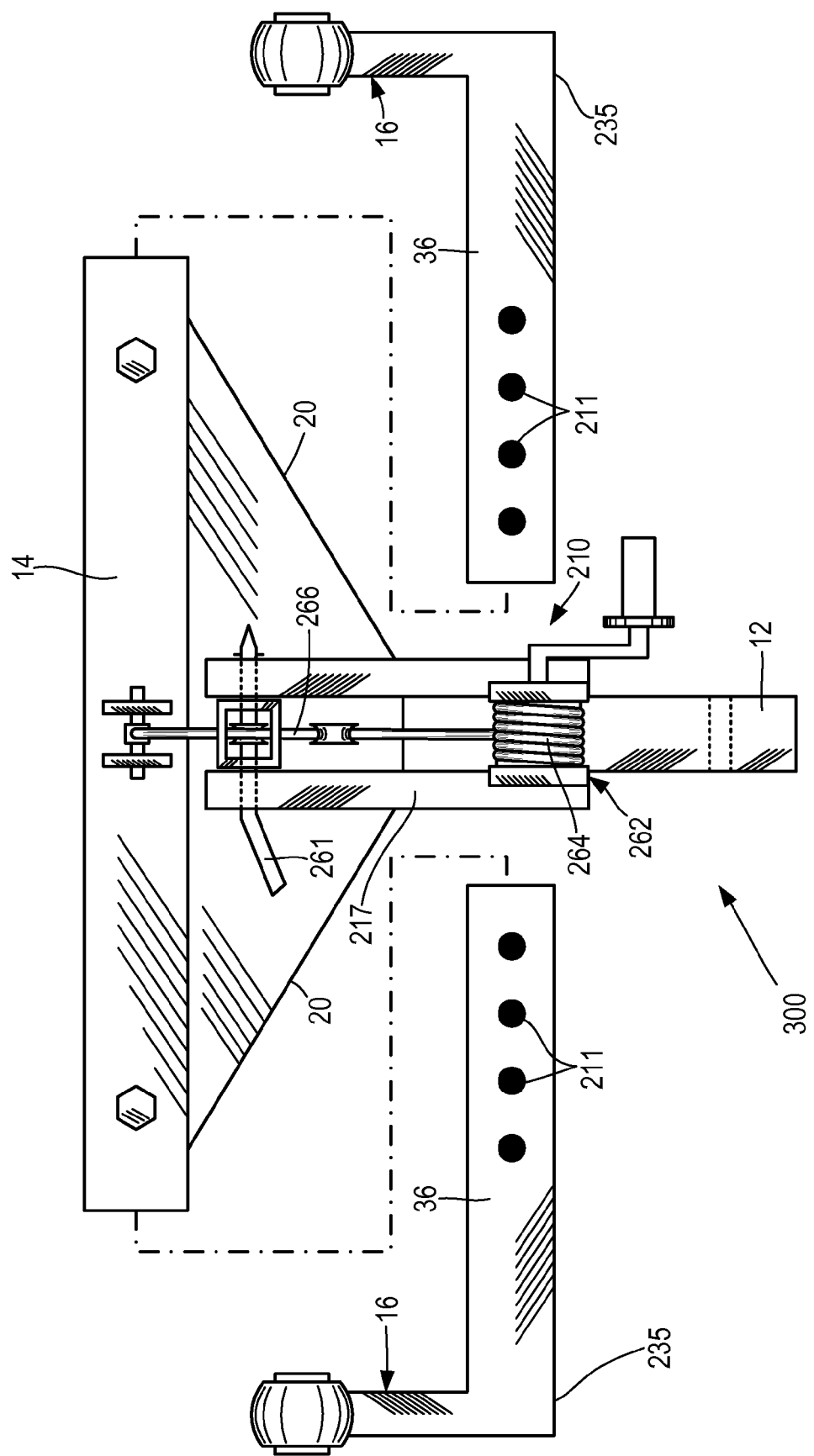
FIG. 15 is a schematic top view of a hitch including a cable-and-pulley actuator system with telescopically extendable segments removed from a support member.
Figure 18:
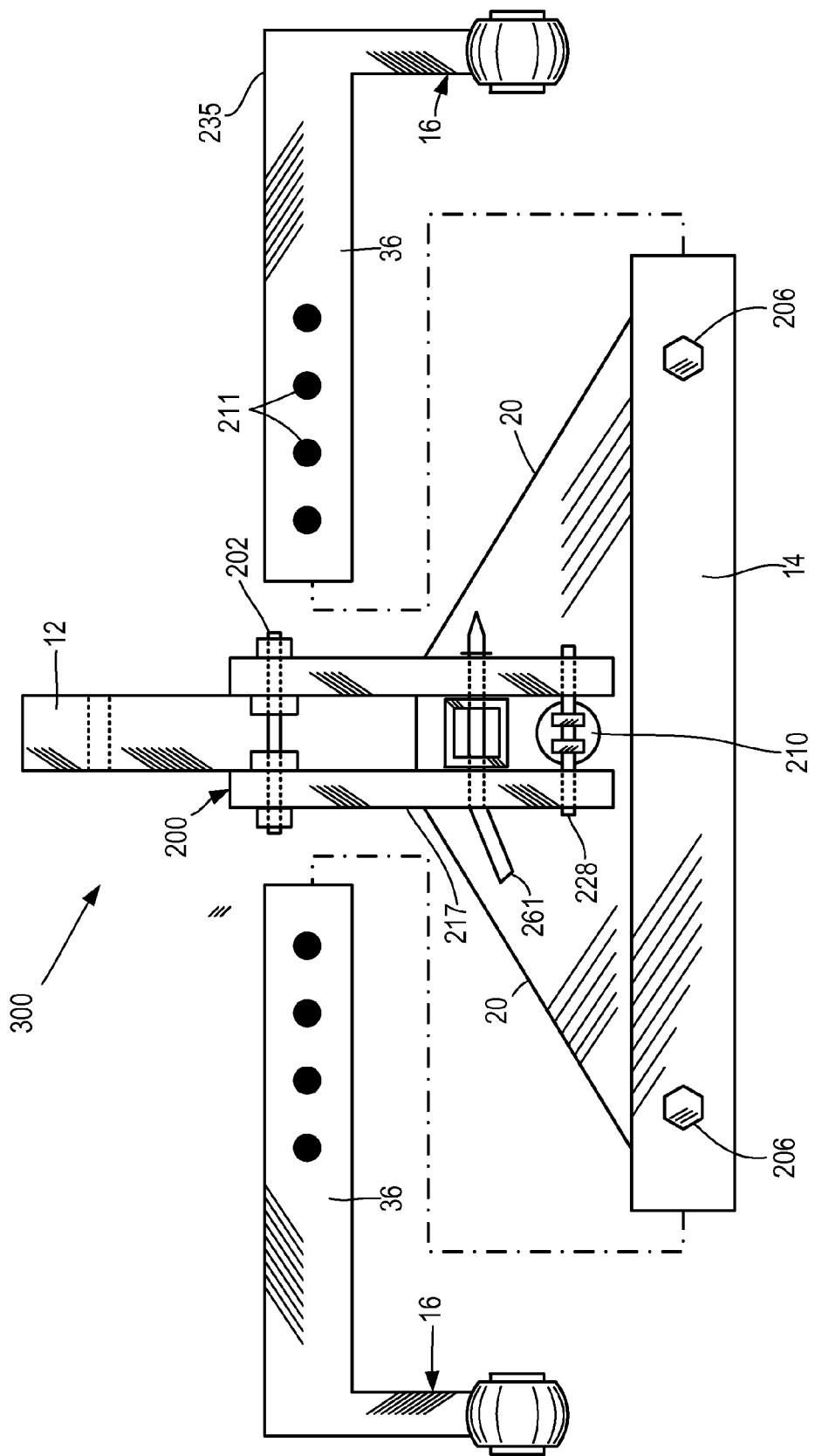
FIG. 18 is a schematic top view of a hitch including a bottle jack actuator system with telescopically extendable segments removed from a support member.

Shown more clearly in FIGS. 15 and 18, the connector 16 supported adjacent to one, or both distal ends 19 of the support member 14 can optionally be coupled to a telescopically-adjustable segment 36 that can be inserted and removed from the support member 14. Another, similar telescopically-adjustable segment 36 can optionally extend from both distal ends 19 of the support member 14. Inserting and extracting the at least one, and optionally both telescopically-adjustable segment(s) 36 adjusts the lateral distance D separating the connector 16 supported adjacent to each distal end 19 of the support member 14 in the directions indicated generally by arrow 204 in FIG. 12. Each telescopically-adjustable segment 36 can include a plurality of apertures 211 (FIG. 15) formed in a top surface thereof and arranged in a longitudinal direction along the telescopically adjustable segment 36. The position of each telescopically-adjustable segment 36 relative to the support member 14 can be maintained in a desired position relative to the support member 14 by aligning one of the apertures 211 with an aperture formed in the support member 14 and extending a locking pin 38 (FIG. 12) through both the aperture in the support member 14 and the aligned aperture 211 formed in the top surface of the telescopically-adjustable segment 36. An optional handle 208 can be provided to the locking pin 38 to facilitate hand removal of the locking pin 38 from, and hand insertion of the locking pin 38 into the support member 14 and telescopically-adjustable segment 36.

An actuator 210, an example of which is shown in FIG. 12, can extend between a portion of the connector assembly 209, such as the support member 14, coupling arms 217, or other portion thereof and a portion of the shank 12 to substantially vertically adjust the support member 14 relative to the shank 12. For the embodiment shown in FIG. 12, the actuator 210 comprises what is commonly referred to as a "bulldog" jack, which is a manually adjustable, mechanical embodiment of the actuator 210. The bulldog jack utilizes a system of cooperating threads to extend and return an internal leg 212 out of, and back into an external cylinder 214. Rotating a crank 219 in a first angular direction causes cooperation of the threads provided between the leg 212 and cylinder 214, thereby causing the leg 212 to be extended from the cylinder 214, thereby pivoting the connector assembly 209 about the hinge pin 202 and elevating the support member 14 to a greater elevation above the ground than the elevation of the support member 14 before rotating the crank 219. Likewise, rotating the crank 219 in a second angular direction, opposite the first angular direction, causes the leg 212 to be drawn back into the cylinder 214, thereby lowering the support member 12 to a lesser elevation above the ground than the elevation of the support member 14 before the crank 219 was rotated in the opposite direction.

For the embodiment in FIG. 12, the bulldog jack, as the actuator 210 in the current embodiment, is operatively coupled between a pair of coupling arms 217 that extend between the hinge 200 and the support member 14. The coupling arms 217 pivotally couple the support member 14 to the hinge 200 and shank 12 for substantially-vertical adjustment of the position of the support member 14. The support member 14, connectors 16 and coupling arms 217 can optionally be arranged in a substantially planar configuration as shown in FIG. 12, capable of being positioned in a common horizontal plane vertically above a horizontal plane of the shank 12 and hollow cavity 78 (FIG. 16) in which the shank 12 is to be received. But any suitable embodiment of the actuator 210, be it a bulldog jack, screw jack, hydraulic cylinder, electrical cylinder, pneumatically-actuated cylinder, cable and pulley system, and the like, to cause substantially vertical adjustment of the support member 14 relative to the ground on which the vehicle 82 is resting is considered to be within the scope of the present invention. Additional components such as a gear, lever and/or any other feature that offers a mechanical advantage in substantially vertically adjusting the support member 14 can be operatively coupled to the actuator 210 as desired without departing from the scope of the present invention. As the leg 212 is being extended out of the cylinder 214, it causes the support member 14 to be rotated about the hinge pin 202, and accordingly, adjusted in the substantially vertical direction to a greater elevation above the ground than the support member 14 was at immediately before extension of the leg 212 from the cylinder 214 was initiated.

The actuator 210 can optionally be secured to the shank 12 by a pivotal coupling 225 that allows the actuator to pivot about a pin 227 during the substantially vertical adjustment of the support member 14. Likewise a similar pivotal coupling 228 can optionally be established between the support member 14 and the coupling arms 217 or optionally any other suitable structure that travels with the support member 14 as it is being substantially vertically adjusted. Thus, during the substantially-vertical adjustment of the support member 14 the orientation of the actuator 210 relative to the coupling arms 217 and shank 12 can also change.

The hinge pin 202 about which the coupling arms 217, and accordingly the support member 14 pivots is supported at an elevation generally above the shank 12 as shown in FIG. 12 by member 215. Elevating the connector assembly 209 in this manner allows the support member to be substantially-vertically adjusted about the hinge pin 202 in a generally downward direction to an extent that the connectors 16 are located at a vertical elevation that is lower than a vertical elevation of the shank 12 when installed within the recess 78 (FIG. 16). Thus, the leg 212 of the actuator 210 is at least partially extended from the cylinder 214 to position the support member 14, and accordingly the connectors 16, at a vertical elevation above the shank 12.

The connectors 16 supported adjacent the distal ends 19 of the support member 14 are shown in FIG. 12 as each including a metal plate 229 defining an aperture 247 through which the male extension 22 extending from the trailer connector 18 can be inserted to couple the trailer to the hitch 300, as illustrated in FIG. 3b. Once the male extension 22 extends through the aperture 247 a locking pin 25 can optionally be inserted through an aperture 24 formed in the male extension 22 to minimize the likelihood of an unwanted removal of the male extension 22 from the aperture 247.

However, similar to the discussion of the various embodiments of the connector 16 above, alternate embodiments of the connector 16 supported adjacent the distal ends 19 of the support member 14 discussed herein can be independently selected from a female receptor such as the plate discussed above, a gimbal connector such as that shown in and discussed above with reference to FIG. 4b, and any other suitable connector. Yet other embodiments include a male member such as a pin that is to extend through a female trailer connector 18, and the like. Regardless of the sex of each of the connectors 16 and the trailer connectors 18, each connector 16 is compatible with its respective trailer connector 18 to form a linkage there between.

Figures 13, 14:
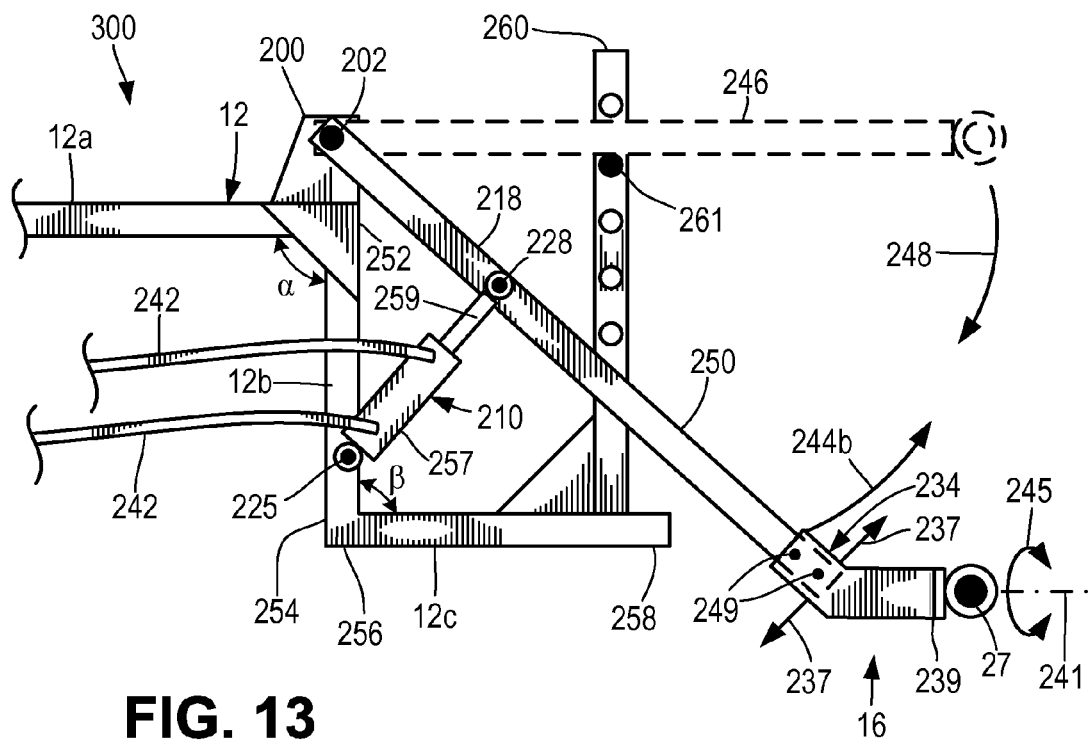
FIG. 13 is a schematic side view of a hitch including a shank including a portion having a lower elevation relative to another portion of the shank that allows for the elevation of the connectors to be substantially-vertically lowered to a greater extent than could be accomplished with a substantially straight shank as depicted in FIG. 12.
FIG. 14 is a schematic side view of a hitch including a cable-and-pulley actuator system.

Yet another embodiment of the connector 16 is shown schematically in FIG. 13. As shown, the gimbal type connector 16 is supported adjacent to an end of a sleeve 234 that can be releasably coupled adjacent to one or both distal ends 19 of the support member 14, and optionally coupled to a distal end of one or more of the telescopically-adjustable segments 36. One or more pins 249 can extend through both a portion of the sleeve 234 and a portion of the telescopically-adjustable segment 36 or support member 14 to which the sleeve is coupled to secure the sleeve 234 thereto. The pins 249 can be removed to release the sleeve 234 and facilitate removal of the sleeve 234, and allow for angular adjustment of the sleeve 234, and accordingly the connector 16, relative to the portion of the hitch 300 to which the sleeve 234 is coupled. The angular adjustment of the connector illustrated in FIG. 13 can occur in the direction indicated by arrows 237. According to an embodiment, the connector 16 can also include a pivotal connection 239 between the gimbal and another portion of the sleeve 234, or between the gimbal and a portion of the support member 14 or telescopically adjustable segment 36 (FIG. 15, for example), or another portion of the hitch 300. The pivotal connection 239 allows for rotation of at least the gimbal portion the connector 16 about an axis of rotation 241 in directions indicated by arrow 245. Portions of the connector 16 including the sleeve 234 and gimbal combination can be rated and sized to cooperate with agricultural trailers of different weights and duty ratings. For example, a class 1 trailer could be coupled to the hitch 300 with a first sleeve 234, while a class 2 trailer could be coupled to the hitch 300 with a second sleeve 234. The first and second sleeves 234 can each optionally include one or more of a gimbal having an internal passage 27 with a different diameter, a gimbal having a different load rating, and the like.

Although a suitably sized connector 16 can be selected to accommodate the desired trailer to be coupled to the tow vehicle 82, a different-sized connector 16 can be provided adjacent to a distal end 235 of each pair of telescopically-adjustable segments 36 described below with reference to FIGS. 15 and 18. Thus, a class 1 rated connector 16 and a class 2 rated connector 16 can each be provided adjacent to the distal end 235 of a pair of the telescopically-adjustable segments 36 to allow a plurality of different class sizes of trailer to be coupled to the tow vehicle 82 by the hitch 300 simply by replacing one pair of the telescopically-adjustable segments 36 with another pair supporting a suitably-sized connector 16. In other words, by allowing different sizes and/or ratings of connector 16 to be provided adjacent to the distal end 235 of adjustable segments 36 having the same dimensions, different sizes of connectors 16 can be used with the same support member 14. Thus, for towing different classes of trailers, different classes of connectors 16 can be provided to the hitch 300 by replacing one telescopically-adjustable segment 36 supporting a first connector 16 with a another telescopically-adjustable segment 36 supporting a suitably-sized connector 16 adjacent to the distal end 235 thereof in the support member 14, for example. The connectors 16 can optionally be welded or otherwise substantially permanently affixed to their respective telescopically-adjustable segment 36, which can be replaced as needed to provide the hitch 300 with a suitably sized connector 16 for a particular towing application.

The embodiments discussed above included an actuator 210 including a bulldog jack, which operates based on mechanical principles such as the cooperation of intermeshing threads. FIG. 13 shows an exemplary embodiment of a hitch 300 including an actuator 210 comprising a hydraulically-actuated cylinder, a bottle jack hand-pump cylinder, bottle jack foot-pump cylinder (i.e., hydraulic fluid introduced into the cylinder due to the cyclical pumping of a foot pedal), bulldog hand-screw jack, an electrically-driven screw jack, pneumatically-actuated cylinder that introduces compressed air into the cylinder to adjust the position of the connectors 16 above the ground, and any other suitable actuator as discussed elsewhere herein, for example. The hydraulic cylinder is a well known actuator, and includes a cylinder 257 and a piston 259. A set of hydraulic conduits 242 deliver and return a minimally-compressible hydraulic fluid (not shown) to and from the hydraulic cylinder 257. By delivering hydraulic fluid behind the piston 259 within the cylinder 257, the building pressure causes the piston 259 to be expelled from the cylinder 257, thereby urging the support member 14 substantially vertically upward, about hinge pin 202 in the direction indicated by arrow 244b, towards a level orientation indicated by the broken lines 246. Similarly, by ejecting hydraulic fluid from the cylinder 257, the lowering pressure causes the piston 259 to be retracted into the cylinder 257 with assistance from gravity, thereby urging the support member 14 substantially vertically downward, about hinge pin 202 in the direction indicated by arrow 248, towards a lowered orientation indicated by the solid lines 250. Just as before, the ends of the hydraulic actuator 210 can extend between pivotal coupling pin 227 and pivotal coupling 228 to minimize stress and/or strain on the hydraulic actuator 210 during substantially vertical adjustments of the support member 14.

The embodiment of the hitch 300 shown in FIG. 13 also illustrates an alternate embodiment of the shank 12 allowing substantially-vertical adjustment of the support member 14, and connectors 16, to a horizontal plane that is at an elevation vertically below a plane of the shank 12 when received within the hollow cavity 78 (FIG. 16). As shown, the shank 12 comprises a first portion 12a that cooperates with the receiver 80 of the vehicle 82 to secure the hitch to the vehicle 82. A second, substantially-vertical portion 12b forms an angle a with the first portion 12a. One end 252 of the second portion 12b adjacent to the first portion has a greater elevation above the ground on which the vehicle 82 rests when the hitch 300 is installed in the receiver 80 than the other end 254 of the second portion 12b. Similarly, a third portion 12c of the shank 12 forms an angle β with the second portion 12b. Both the proximate end 256 and the distal end 258 of the third portion have approximately the same elevation above the ground on which the vehicle 82 rests when the hitch 300 is installed in the receiver 80. Such an arrangement of the portions 12a, 12b, 12c of the shank 12 allows for the elevation of the support member 14 to be substantially-vertically lowered in the direction of arrow 248 to a greater extent than could be accomplished having a substantially straight shank 12 alone such as that illustrated in FIG. 12. Of course the angles α and β, the lengths of each portion 12a, 12b, 12c of the shank 12, and points of connection can be selected as desired in accordance with sound engineering judgment. For the embodiment shown in FIG. 13, however, the angles α and β are each approximately 90°.

The actuator 210 in FIG. 13, which is shown as a hydraulic cylinder, again extends between the coupling arms 217 and the shank 12. However, the pin 227 forming a portion of the pivotal connection between the actuator 210 and the shank 12 in FIG. 13 is supported by the substantially-vertical portion 12b of the shank 12. This pivotal connection between the actuator 210 an the second portion 12b of the shank 12 falls within a horizontal plane that is at a vertical elevation below the horizontal plane in which the first portion 12a of the shank 12 is located. Thus, the actuator 210 can be retracted to position the support member 14, and accordingly the connectors 16, at a vertical elevation that is lower than the first portion 12a of the shank 12, and optionally at a vertical elevation that is lower than the third portion 12c of the shank 12 when the hitch 300 is installed on the vehicle 82 (FIG. 16). The actuator 210 can also be adjusted to orient the support member 14 and connectors in a substantially common plane with the pivot pin 202 as illustrated by broken lines 246 in FIG. 13. With the support member so positioned the pivotal coupling 228 is elevated to a greater elevation than the first portion 12a of the shank 12. Thus, the range of motion along which the support member 14 can travel is enhanced.

According to alternate embodiments, the actuator 210 can be pivotally connected to the third portion 12c of the shank 12 instead of the second portion 12b as described above. Again, such a connection would fall within a horizontal plane that is at a vertical elevation below the horizontal plane in which the first portion 12a of the shank 12 is located. Thus, the actuator 210 can extend between the horizontal plane at the vertical elevation below the horizontal plane of the first portion 12a of the shank 12 and an elevation that is vertically above the plane of the first portion 12a of the shank 12. The actuator 210 can be retracted to pivotally adjust the position of the support member 14, and accordingly the connectors 16, between upper and lower travel limits. The upper travel limit is at a vertical elevation above the vertical elevation of the first portion 12a of the shank 12, and the lower travel limit can be lower than the first portion 12a, and optionally the third portion 12c of the shank 12.

Referring again to FIG. 13, a multi-position support post 260 and a relief pin 261 or other suitable weight bearing device can optionally be provided to maintain the position of the support member 14 above the ground once the desired elevation of the support member 14 above the ground has been established. As shown in the embodiment in FIG. 13, the support post 260 and relief pin 261 also maintain the relative positions of the support member 14 to the shank 12, when engaged.

Following adjustment of the support member 14 to the desired elevation, the relief pin 261 can be installed in the support post 260 at the closest position beneath the final position to which the support member 14 was adjusted. With the relief pin 261 or other suitable weight bearing device in place, the actuator 210 can be "backed off" from its final adjustment, thereby allowing the weight of the agricultural trailer to rest on the relief pin 261 or other weight bearing device and not entirely on the actuator 210. Thus, while the vehicle 82 is underway the weight exerted by the agricultural trailer is not necessarily supported by the actuator 210, but instead, by the relief pin 261.

An alternate embodiment of the hitch 300 is shown in FIG. 14. In FIG. 14, a winch-and-pulley embodiment of the actuator 210 is included for substantially-vertically adjusting the support member 14. As shown, a hand or electrically-driven winch 262 is coupled atop the hinge assembly 200. The winch 262 includes a spool 264 about which a steel braided or other suitably strong cable 266 is wound. A free-wheeling pulley 268 is coupled to the shank 12, along with the support post 260. Another free-wheeling pulley 270 is supported by the support post 260. The cable 266 is rolled from around the spool 264, under the pulley 268 coupled to the shank 12 and over the pulley 270 supported by the support post 260 to be coupled to the support member 14, coupling arm 217, or any other suitable structure that moves along with the support member 14 during an adjustment.

Rotating the spool 264 in a direction indicated by arrow 272 lets the cable 266 out and allows the support member 14 to be substantially-vertically lowered in the direction of arrow 274 under its own weight. Rotating the spool 264 in the other direction indicated by arrow 276 takes the cable 266 in and substantially-vertically raises the support member 14 in the direction of arrow 278. Once sufficiently raised, the relief pin 261 can be inserted through the support post 260 as well as the coupling arm 217, for example, and the spool 264 "backed off" to let out a small portion of the cable 266, thereby allowing the weight to rest on the relief pin 261.

The connector 16 shown in FIG. 14 is also coupled to the telescopically-adjustable segment 36, which is also represented by the broken lines in FIG. 14 but more clearly seen in FIG. 15, which is a top view of the hitch 300. When the hitch 300 is properly positioned relative to the trailer, each of the telescopically-adjustable segments 36 can be inserted into their respective side of the support member 14, and then secured in place with the locking pin 38.

Figure 17:
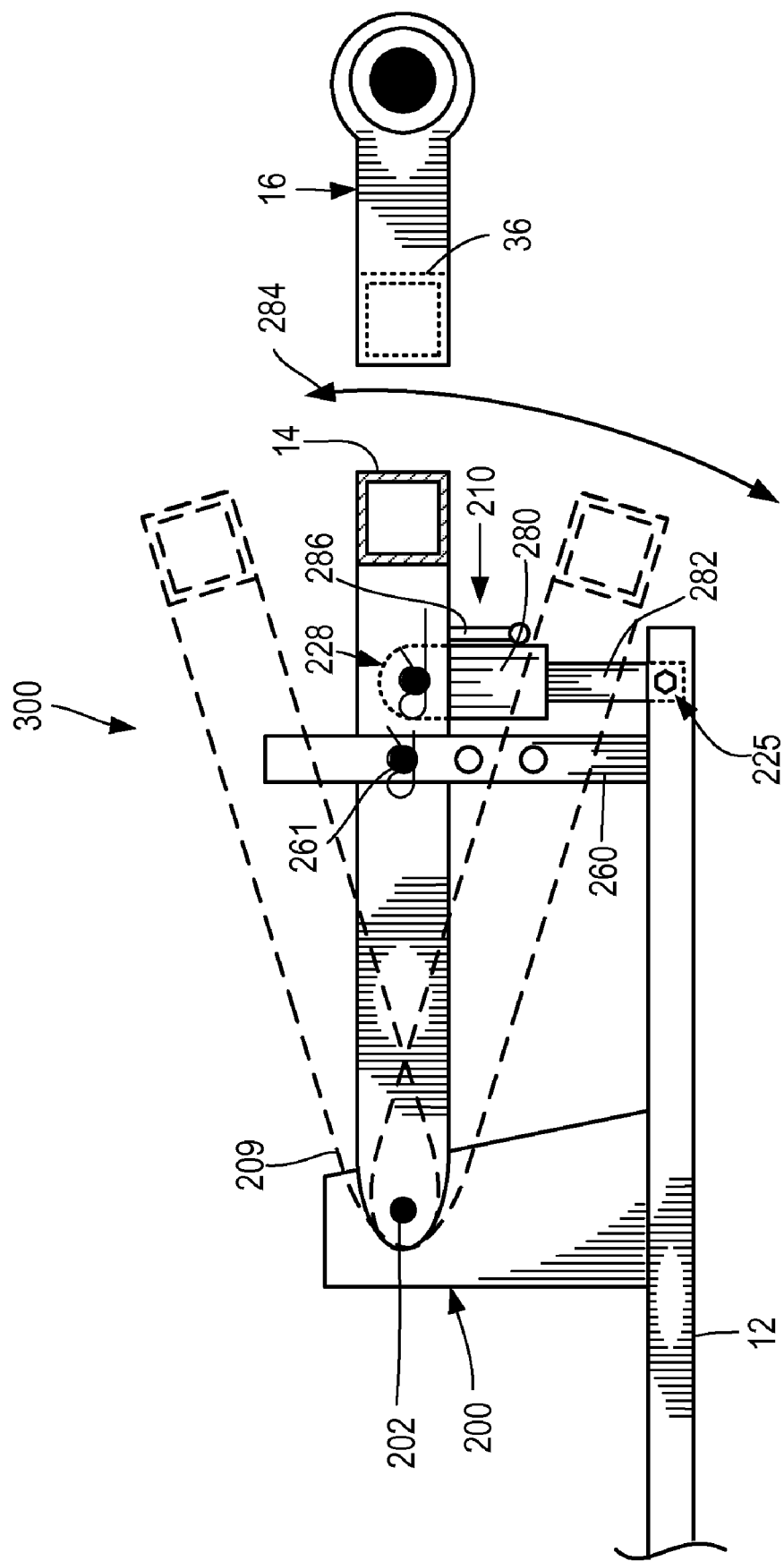
FIG. 17 is a schematic side view of a hitch including a bottle jack actuator system.

Another alternate embodiment is shown in FIG. 17, wherein a hydraulic "bottle" jack embodiment of the actuator 210 is provided to the hitch 300 for substantially-vertically adjusting an elevation of the support member 14. Much like the bulldog jack, a bottle jack includes a cylinder 280 and a piston 282 that can travel into and out of the cylinder 280. However, instead of a mechanical linkage that controls the travel of the piston 282 relative to the cylinder 280, a variable pressure generated by controlling the flow of hydraulic between a reservoir and the cylinder 280 expels and retracts the piston 282 from and into the cylinder 280, respectively. A pivotal coupling 225, 228 can couple each end of the hydraulic bottle jack actuator 210 to allow for adjustment of the support member 14 about the hinge pin 202. A manually-actuated lever 286 is provided to the bottle jack embodiment of the actuator 210 to convert a mechanically imparted force on the lever 286 into hydraulic fluid pressure within the cylinder 280. Thus, as the lever 286 is pumped in a manner known in the art, the hydraulic pressure builds within the cylinder 280, thereby expelling the piston 282 and causing the support member 14 to be substantially-vertically raised in the direction indicated by arrow 284. Although the bottle jack operates based on a hydraulic principle, the reservoir is self contained within the jack and thus the hitch 300 does not rely on an external supply of hydraulic fluid to be delivered to/from the cylinder 257 through hydraulic conduits 242 such as the actuator 210 discussed above with regard to FIG. 13. Also, the bottle jack is manually pumped by operation of the lever 286, while the hydraulic system in FIG. 13 includes a powered pump system 288 (FIG. 16) to pump the hydraulic fluid through hydraulic conduits 242 into the hydraulic cylinder 257.

Similar to the embodiment discussed with regard to FIG. 15, the connector 16 in FIG. 17 is also coupled to the telescopically-adjustable segment 36 represented by the broken lines in FIG. 17, and more clearly shown in FIG. 18, which is a top view of the hitch 300. When the hitch 300 is properly positioned relative to the trailer, each of the telescopically-adjustable segments 36 can be removed from and inserted into their respective side of the support member 14, and then secured in place with the locking pin 38.

Use of a hydraulic embodiment will be described with reference to FIG. 16. At least a portion of the shank 12 is inserted into the cavity 78 of the receiver 80 secured to the vehicle 82. The hydraulic conduits 242 in fluid communication with a hydraulic fluid reservoir 292 and pump system 288 are coupled to the hydraulic actuator 210 to transport hydraulic fluid through hydraulic conduits 242 between the hydraulic cylinder 257 and the hydraulic fluid reservoir 292 to control substantially vertical adjustment of the support member 14 and connectors 16. The reservoir 292 and pump system 288 can suitably be wired into the vehicle's electric system to obtain the necessary electrical current required for operation from the battery and/or alternator (not shown). A remote control 290 in operative communication with the pump system 288 transmits user-input instructions regarding the substantially vertical adjustment of the support member 14 to selectively activate and deactivate the pump system 288 to control the flow of hydraulic fluid between the reservoir 292 and the hydraulic cylinder 257. The remote control 290 can be hardwired to the reservoir and pump system 288, or can communicate over a wireless control channel with the pump system 288. Further, the remote control 290 can be accessed externally of the vehicle 82 as shown in FIG. 16, or can be accessed from within the vehicle 82 or from a remote location away from the vehicle 82.

Before the vehicle 82 is backed close to the trailer to which it will be coupled by the hitch 300, one or both of the telescopically-adjustable segments 36 are at least partially extracted from the support member 14 to extend the lateral distance D separating the connectors 16. The vehicle 82 can then be backed close to the agricultural trailer and the elevation of the connectors 16 adjusted through operation of the actuator 210 as instructed via the remote control 290 to substantially match the elevation of the male extensions 22 of the trailer connector 18. The adjustment of the elevation of the support member 14 and connectors 16 is accomplished by controlling operation of the hydraulic (or any other type) actuator 210.

Also adjustable segments 36, such as those shown in FIG. 18 for example, can support different sizes of connectors 16, or according to alternate embodiments, the different sizes of connector 16 can optionally be interchangeable on the same adjustable segment 36. The common dimensions of the adjustable segment 36, however, allow a plurality of different sizes of trailer to be coupled to the tow vehicle 82 with the hitch 300.

Once the elevations of the support member 14 and the male extensions 22 are approximately the same, the telescopically-adjustable segments 36 supporting the connectors 16 are returned to the support member 14 or telescopically inserted into the support member 14 until the male extensions 22 extend through the internal passage 27 in the connectors 16.

Once coupling has been completed, the hydraulic actuator 210 can again be operated to raise the portion of the agricultural trailer coupled to the support member 14 to a suitable elevation for navigation of the public roadways. The suitable elevation is high enough to transport the trailer being towed over public roadways as the trailer was designed to be towed. For instance, the entire trailer can be elevated off the ground to be transported when the suitable elevation is reached. As another example, depending on the trailer, the suitable elevation could be high enough to allow wheels of the trailer to contact and roll along the roadways while in transit. After the suitable elevation of the support member 14 has been achieved, the relief pin 261 can be inserted into the optional support post 260 at a level that maintains the support member 14 at a suitable elevation for navigating the public roadways with the trailer in tow. After the relief pin 261 is in place, the hydraulic actuator can be backed off, allowing at least a portion of the weight of the support member 14, supporting the portion of the trailer weight, to rest on the relief pin.

Figure 2B:
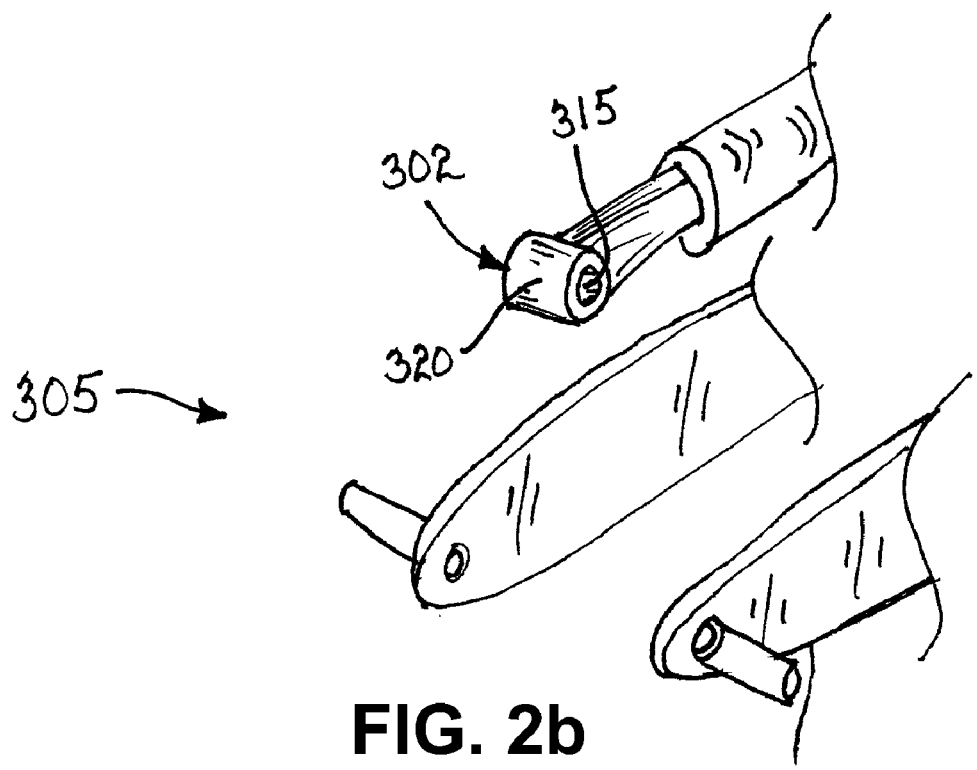
FIG. 2b is a perspective view of a connector portion of a three-point trailer/agricultural implement to be releasably coupled to an agricultural tractor.
Figure 19:
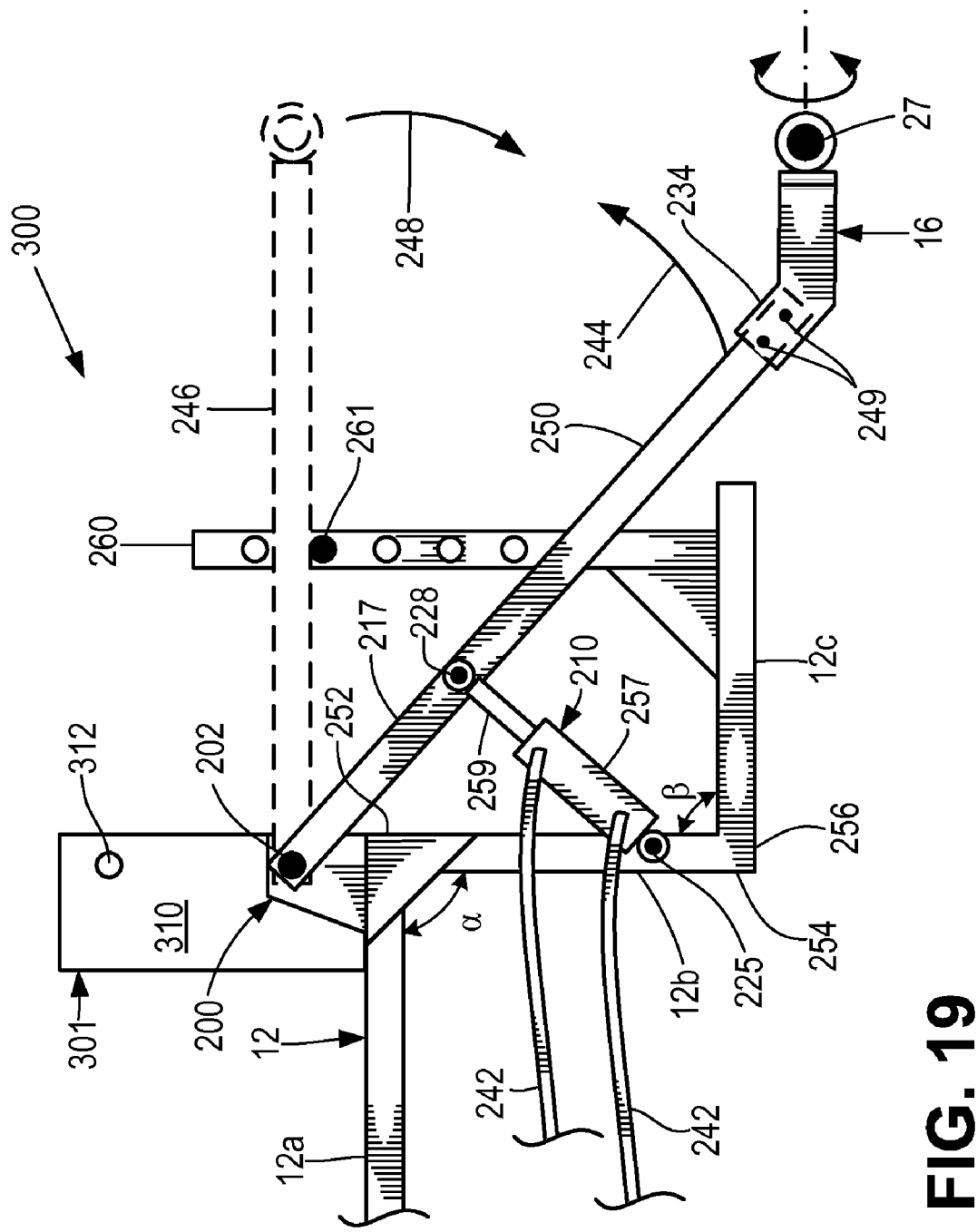
FIG. 19 is a schematic side view of a hitch including an upper connection point for communicating with an upper arm link of a three-point trailer connector.

An alternate embodiment of the hitch 300, shown in FIG. 19, can optionally include an upper connection point 301 to which an upper link arm 302 such as that shown in FIG. 2b can be coupled for connecting a trailer with a three-point trailer connector 305 to the tow vehicle 82. The laterally-disposed trailer connectors 18 of the three-point trailer connector 305 with outwardly-extending male extensions 22 in FIG. 2b are similar to those extending from the trailer connectors 18 described above with reference to FIG. 3a.

As shown in FIG. 19, a pair of substantially parallel metal plates 310 (one plate 310 of the pair shown in FIG. 19 is hidden directly behind the visible plate 310) extend upwardly from the shank 12, the hinge assembly 200, or any other suitable portion of the hitch 300. The plates 310 can extend 16-18 inches, for example, or any desired distance above the hinge assembly 200. Each plate 310 defines an aperture 312, and the aperture 312 in each plate is coaxially aligned with the aperture 312 formed in the other plate 310. A receiver 320 (FIG. 2b) provided adjacent to a distal end of the upper link arm 302 can be placed between the plates 310 such that an aperture 315 defined by the receiver 320 is coaxially aligned with the aperture 312 formed in the plates 310. A pin (not shown) similar to the pin 17 in FIG. 1 can be inserted through the aperture 312 formed in both plates 310 along with the aperture 315 of the receiver 320 of the upper link arm 302 to releasably couple the receiver 320, and accordingly the distal end of the upper link arm 302 to the connection point 301. With the trailer including a three-point trailer connector 305 coupled to the hitch 300 as described above, the actuator 210 can be controlled to elevate the coupling arm 217 about the hinge pin 202, thereby elevating the trailer above the ground.

Figure 20:
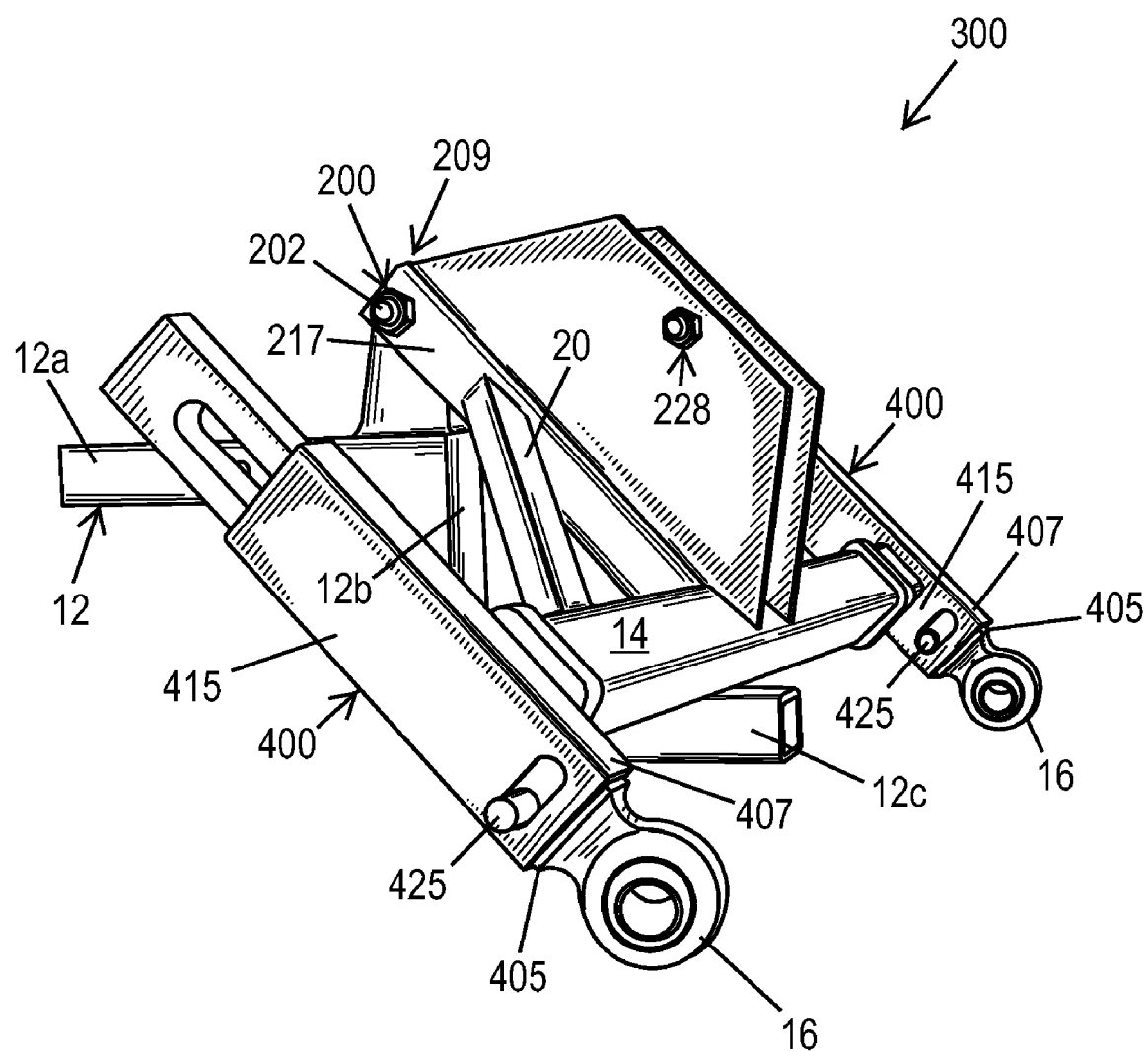
FIG. 20 is a schematic side view of an embodiment of a hitch according to the present invention including an extendable connector assembly, wherein the arms are in a retracted position.
Figure 21:
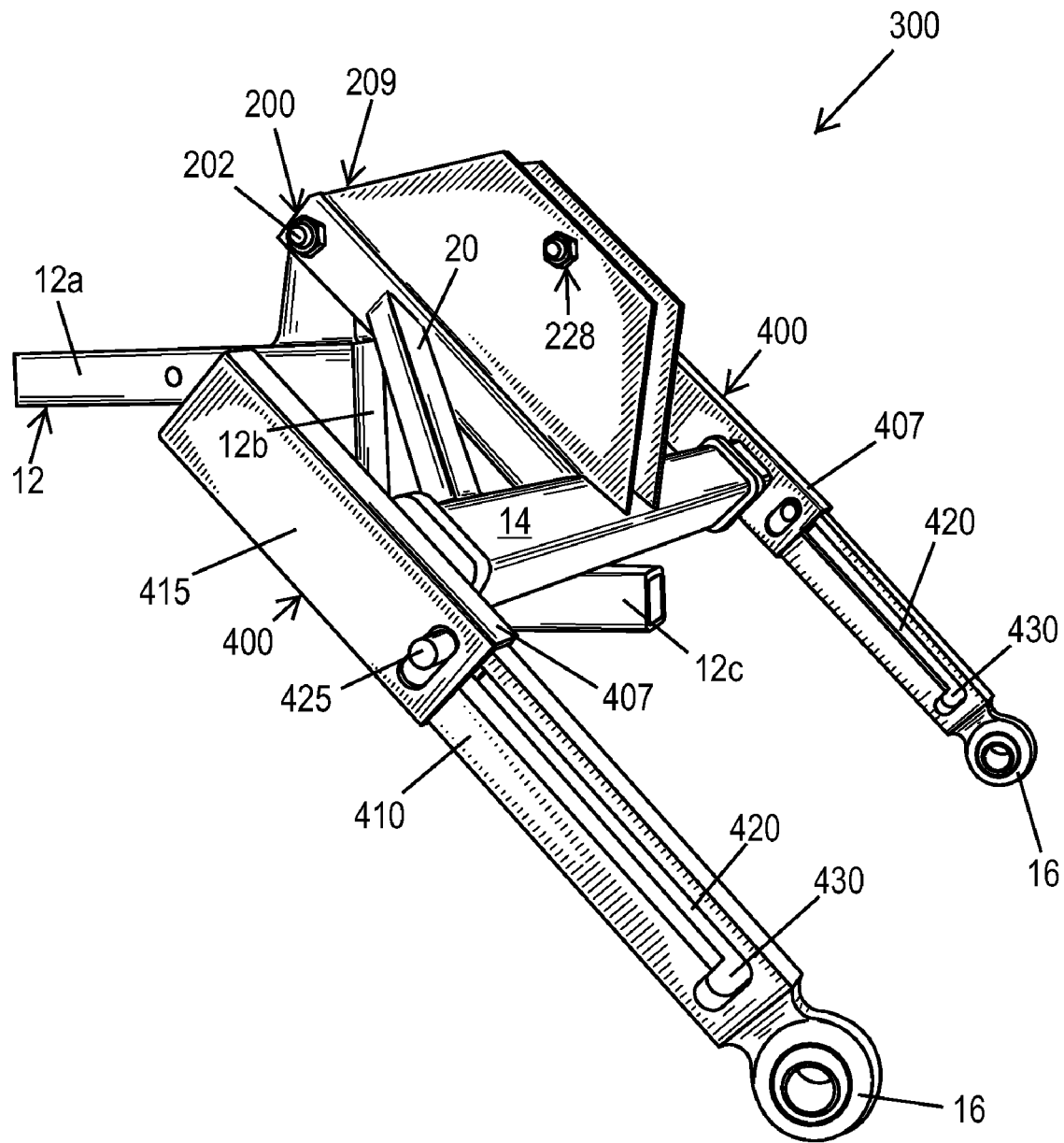
FIG. 21 is a schematic side view of an embodiment of a hitch according to the present invention including an extendable connector assembly, wherein the arms are in an extended position.

Backing the tow vehicle 82 close enough to the trailer to be coupled to the hitch 300 can be difficult due to limited visibility. To minimize the accuracy required of the operator of the tow vehicle 82 to bring the hitch 300 within a close proximity of the trailer, alternate embodiments can optionally include an extendable connector assembly 400 coupling the connectors 16 to the support member 14, as shown in FIGS. 20 and 21. The connectors 16 can be supported adjacent a distal end of each extendable arm 410 that can be extended in an outward direction, generally away from the connector assembly to extend a reach of the hitch in the outward direction without moving the vehicle to which the hitch is coupled. The extendable connector assembly 400 also enables substantially-vertical adjustment of the connectors 16 to an elevation well below the elevation of the shank 12, specifically lower than the first portion 12a and optionally the third portion 12c of the shank 12. Further, the extendable connector assembly 400 also allows extension of the connectors 16 in a longitudinal direction that is generally away from the hinge 200, substantially perpendicular to the transverse direction in which the support member 14 can extend. The extendable connector assembly 400 can optionally couple the connectors 16 adjacent to the distal ends 235 of the adjustable segments 36, in a manner similar to that shown in FIG. 15 for example, that can be telescopically adjusted relative to the support member 14. Such embodiments allow the lateral distance separating the connectors 16 connectors to be selectively adjustable to a plurality of different, predetermined distances. According to the embodiments shown in FIGS. 20 and 21, the lateral distance D (FIG. 12) separating the connectors 16, the elevation of the connectors 16 above the ground, as well as the distance to which the connectors 16 are extended generally away from the hinge 200 can be adjusted to simplify connection of the trailer to the tow vehicle 82 via the hitch 300. When the support member 14 and connectors 16 are pivotally adjusted in the downward direction about the hinge pin 202 of the hinge 200 and are oriented at a downward angle as shown in FIGS. 20 and 21, extension of the connectors 16 as described in detail below and shown in FIG. 21 can position the connectors 16 to within a close proximity of the ground on which the tow vehicle 82 is resting.

The connector 16, which in the embodiment shown in FIGS. 20 and 21 is the gimbal embodiment of the connector 16, is provided adjacent to a leading end 405 of an arm 410 that is extendable from within a sleeve 415. The arm 410 defines an aperture 420 that acts as a track to limit the extent to which the arm 410 can be extended from the sleeve 415. A spring-biased pin 425 extends into the aperture 420 and rides therein as the arm 410 is extended from and retracted back into the sleeve 415. When the arm 410 is fully retracted into the sleeve 415 as shown in FIG. 20, the spring-biased pin 425 is biased by the force of the spring into a recess 430 (the recess being shown clearly with the arm 410 is fully extended in FIG. 21). Instead of, or in addition to the recess 430, alternate embodiments can include any other suitable device that can receive the spring-actuated pin 425 or otherwise limit the maximum allowable travel distance of the arm 410. With the spring-actuated pin 425 received within the recess 430, extension of the arm 410, and accordingly the connector 16 from the sleeve 415 is restricted.

FIG. 20 illustrates the extendable arm 410 in a fully retracted position with the spring-actuated pin 425 disposed within the recess 430. In use, the tow vehicle 82 can be backed adjacent to the trailer to be towed. If the trailer is out of reach of the hitch coupled to the tow vehicle 82, the spring-biased pins 425 can be removed from their respective recesses 430 using a lever 407 exposed at the top of each sleeve 415. The lever 407 coupled to adjust the position of the spring-biased pin in the recess 430, and is operable to elevate the spring-biased pins 425 from their respective recesses 430 to allow the arms 410 to be extended outwardly from the sleeves 415 generally toward the trailer as shown in FIG. 21. If desired, the height of the connectors 16 above the ground can be substantially vertically adjusted such that, when extended, the arms 410 support the connectors 16 to line up with the male extensions 22 of the trailer as discussed above with respect to FIG. 3b. Insertion and removal of the arms 410 into and out of the sleeves 415 can optionally be independent, allowing the connectors 16 to be offset in the event the male extensions 22 of the trailer are not exactly parallel to the transverse axis of the hitch 300.

Once the connectors 16 are aligned with the male extensions 22 of the trailer connector 18, the adjustable segments 36 can be inserted into the support member 14 to adjust the lateral distance D (FIG. 20) separating the connectors 16 and place the connectors 16 over the male extensions 22, allowing the male extensions to extend through the internal passage 27 (FIG. 4c) of the connector. The locking pin 38 (FIG. 20) can be inserted through the support member 14 and one of the apertures 211 (FIG. 15) to interfere with further insertion and removal of the adjustable segments 36 relative to the support member 14. The actuator 210 can be controlled to substantially vertically adjust the height of the connectors 16 in the substantially vertically upward direction. Vertically adjusting the height of the connectors 16 in this manner elevates the trailer connector 18 coupled to the connectors 16 to a height suitable for towing the trailer. For example, the actuator 210 can be controlled to elevate the connectors 16 to a substantially planar relationship with the sleeves 415, and optionally with the support member 14 and hinge pin 202 as shown in broken lines 246 in FIG. 21.

With the connectors 16 in the substantially planar relationship with the sleeves 415 the tow vehicle 82 can be backed towards the trailer, thereby forcing the arms 410 into their respective sleeves 415. The arms 410 can be inserted into their respective sleeves until the spring-biased pins 425, under the force imparted by the springs and without manual user intervention to position the pins 425 within their recesses 430 other than backing the vehicle towards the trailer, are each received in their respective recesses 430. The operator may sense the receipt of the spring-biased pins 425 in their respective recesses 430 by sound, by feeling the spring-actuated pin 425 being received, or any other suitable indication, and drive away.

According to alternate embodiments, the user can optionally use the multi-position support post 260 in FIG. 21 along with the relief pin 261 to maintain the position of the support member 14 above the ground while the tow vehicle 82 is underway.

Following adjustment of the connectors to the desired elevation, the relief pin 261 can be installed in the support post 260 at the closest position beneath the final position to which the support member 14 was adjusted. With the relief pin 261 in place the actuator 210 can be "backed off" or lowered from its final adjustment elevation before the relief pin was inserted to thereby allow the weight of the agricultural trailer to be at least partially supported by the relief pin 261 instead of entirely by the actuator 210. For the hydraulic cylinder and bottle jack embodiments of the actuator 210, the actuator 210 can be placed in a "float" mode that allows the actuator 210 to be lowered under the force of gravity instead of the dynamic flow of the hydraulic fluid. The float mode allows the support member 14 and connectors 16 to be gradually lowered under the force of gravity until further adjustment is prevented by the relief pin 261. Thus, while the vehicle 82 is underway the weight exerted by the agricultural trailer is not necessarily supported by the actuator 210, but instead, by the relief pin 261.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention.

What is claimed is:

1. A hitch for towing an agricultural implement behind a vehicle licensed to navigate public roadways, the hitch comprising:

a base member comprising: an elongated shank having a substantially rectangular cross section, to be at least partially inserted into a substantially rectangular interior passage defined by a receiver coupled to the vehicle to couple the hitch to the vehicle, and a lower portion disposed at a vertical elevation lower than a plane of the shank when the shank is at least partially received within the receiver coupled to the vehicle;

a connector assembly comprising a transverse member supporting a first adjustable segment comprising a connector adjacent a first lateral end of the first adjustable segment and a second connector adjacent a second lateral end of the transverse member opposite the first lateral end, the first and second connectors each being adapted to cooperate with different portions of a three-point fastener configuration provided to the agricultural implement, wherein the first adjustable segment being adjustable relative to the transverse member to adjust a lateral distance separating the first and second connectors substantially in a plane of the transverse member;

a hinge assembly for pivotally coupling the connector assembly to the base member; and an actuator coupled adjacent one end to the lower portion of the base member and adjacent another end to the connector assembly, the actuator being extendable to pivot the transverse member about the hinge assembly to selectively elevate the first and second connectors relative to the base member towards an upper travel limit and being retractable to pivot the transverse member about the hinge assembly to selectively lower the transverse member towards a lower travel limit, wherein the upper travel limit is vertically above the shank and the lower travel limit is vertically below the shank when the hitch is coupled to the vehicle.

2. The hitch of claim 1, wherein the lateral distance separating the first and second connectors is selectively adjustable to a plurality of different, predetermined distances.

3. The hitch of claim 2, wherein the adjustable segment is telescopically adjustable relative to the transverse member to be partially inserted into and withdrawn from the transverse member to adjust the lateral distance separating the first and second connectors.

4. The hitch of claim 1, wherein the first and second connectors each comprise a gimbal receiver that is adjustable about a plurality of axes.

5. The hitch of claim 1, wherein each of the first and second connectors is supported adjacent a distal end of an extendable arm that can be extended in an outward direction, generally away from the connector assembly to extend a reach of the hitch in the outward direction without moving the vehicle to which the hitch is coupled.

6. The hitch of claim 5, wherein the lateral distance separating the first and second connectors is selectively adjustable to a plurality of different, predetermined distances.

7. The hitch of claim 5, wherein the first and second connectors adjacent the distal end of the extendable arm is a gimbal connector.

8. The hitch of claim 5 further comprising a locking device to interfere with extension of the extendable arm in the outward direction when the arm is in a retracted position and not extended generally outward away from the connector assembly.

9. The hitch of claim 8, wherein the locking device includes a recess formed in the extendable arm for receiving a locking pin provided adjacent to respective lateral ends of the transverse member.

10. The hitch of claim 1 further comprising:
a sleeve supported adjacent to each of the first and second lateral ends of the transverse member;
an extendable arm that can be telescopically extracted from and inserted into each sleeve, wherein
the first connector and second connector are each supported adjacent a distal end of one of the extendable arms to be positioned a greater distance in a generally outward direction away from the base member when the extendable arms are extracted from the sleeves than when the extendable arms are inserted into the sleeves.

11. The hitch of claim 10, wherein the first and second connectors each include a gimbal receiver.

12. The hitch of claim 10, wherein at least one of the extendable arms comprises an elongated aperture defining a range of travel of the extendable arm relative to the sleeve.

13. The hitch of claim 12, wherein the elongated aperture comprises a recessed portion extending generally away from a longitudinal axis of the elongated aperture to interfere with telescopic adjustment of the at least one of the extendable arms relative to the sleeve.

14. The hitch of claim 1, wherein the actuator is selected from a group consisting of:
a manually actuated mechanical cylinder, a hydraulically-actuated cylinder, an electrically-actuated cylinder, a pneumatically-actuated cylinder, and a cable-and-pulley system.

15. The hitch of claim 1, wherein the first and second connectors are arranged in a substantially planar configuration relative to the transverse member.

16. The hitch of claim 1 further comprising a support member that includes a relief device that substantially maintains an elevation of the first and second connectors and relieves the actuator from supporting at least a portion of a force imparted by the agricultural implement when the agricultural implement is coupled to the vehicle by the hitch.

* * * * *